(12) United States Patent
Ibi et al.

(10) Patent No.: US 8,503,502 B2
(45) Date of Patent: Aug. 6, 2013

(54) RADIO COMMUNICATION SYSTEM, TRANSMISSION DEVICE, RECEPTION DEVICE, AND COMMUNICATION METHOD

(75) Inventors: Shinsuke Ibi, Suita (JP); Seiichi Sampei, Suita (JP); Shinichi Miyamoto, Suita (JP); Kazunari Yokomakura, Osaka (JP); Minoru Kubota, Osaka (JP); Yasuhiro Hamaguchi, Osaka (JP); Shimpei To, Osaka (JP); Osamu Nakamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 386 days.

(21) Appl. No.: 12/935,243

(22) PCT Filed: Apr. 22, 2009

(86) PCT No.: PCT/JP2009/058013
§ 371 (c)(1),
(2), (4) Date: Sep. 28, 2010

(87) PCT Pub. No.: WO2009/131156
PCT Pub. Date: Oct. 29, 2009

(65) Prior Publication Data
US 2011/0044377 A1    Feb. 24, 2011

(30) Foreign Application Priority Data
Apr. 22, 2008 (JP) ................................ 2008-111496

(51) Int. Cl.
*H04B 1/00* (2006.01)
(52) U.S. Cl.
USPC .......................................... 375/133; 375/130
(58) Field of Classification Search
USPC .................. 375/133, 130, 341, 347; 370/203, 370/338; 455/67.11, 436, 461
See application file for complete search history.

(56) References Cited

U.S. PATENT DOCUMENTS

2009/0046652 A1 * 2/2009 Shitara et al. ................. 370/330
2009/0209256 A1   8/2009 Nakashima et al.

FOREIGN PATENT DOCUMENTS

| JP | 2006-136259 A | 6/2006 |
| WO | WO 2007/132861 A1 | 11/2007 |
| WO | WO 2008/105214 A1 | 9/2008 |

OTHER PUBLICATIONS

Ibi et al., "EXIT Chart-Aided Adaptive Coding for Multilevel BICM With Turbo Equalization in Frequency-Selective MIMO Channels", IEEE Transactions on Vehicular Technology, vol. 56, No. 6, Nov. 2007, pp. 3757-3769.

(Continued)

*Primary Examiner* — Khai Tran
(74) *Attorney, Agent, or Firm* — Birch, Stewart, Kolasch & Birch, LLP

(57) ABSTRACT

A clipping rate is controlled in spectrum shaping according to a propagation path to thereby improve transmission characteristics and perform communication at a stable transmission rate.

Propagation path characteristics are detected by a propagation path information detection unit 5 for detecting propagation path information fed back from a base station device and a water filling principle for distributing energy by a primary spectrum shaping unit 6 according to the propagation path characteristics is applied to transmission spectrum obtained by a DFT unit 4. Clipping information in secondary spectrum shaping fed back from the base station device is detected by a clipping information detection unit 7 to perform the secondary spectrum shaping by a secondary spectrum shaping unit 8. At this time, with the clipping rate by the secondary spectrum shaping unit 8, clipping rates of all transmission devices multiplexed in a scheduling unit 26 of the base station device are controlled adaptively.

17 Claims, 13 Drawing Sheets

OTHER PUBLICATIONS

Kawakita et al., "A Study on Frequency Resource Managements Exploiting Spectrum Clipper Transmit Signals", The Institute of Electronics, Information and Communication Engineers, Proceedings of the 2009 IEICE General Conference, Mar. 17-20, 2009, p. 512.

Mashima et al., "A Study on Broadband Single Carrier Transmission Technique Using Dynamic Spectrum Control", The Institute of Electronics, Information and Communication Engineers, Technical Report, vol. 106, No. 480, Jan. 26, 2007, pp. 97-102.

Matsumoto et al., "Turbo Equalization: Fundamentals and Information Theoretic Considerations", The Transactions of the Institute of Electronics, Information and Communication Engineers B, vol. J90-B, No. 1, Jan. 1, 2007, pp. 1-16.

Okada et al., "A Proposal on Spectrum Shaping Exploiting Frequency Clipping for Turbo Equalization", The Institute of Electronics, Information, and Communication Engineers, Technical Report, vol. 106, No. 555, pp. 96-98, Mar. 7-9, 2007.

Okada et al., "A Study on Spectrum Division Multiplexing Technique Exploiting Frequency Clipped Spectrum Shaping for Turbo Equalization", The Institute of Electronics, Information and Communication Engineers, Proceedings of the 2007 IEICE General Conference, Mar. 20-23, 2007.

Okada et al., "Spectrum Shaping Technique Combined With SC/MMSE Turbo Equalizer for High Spectral Efficient Broadband Wireless Access Systems", 2007, http:\\www2a.comm.eng.osaka-u.ac.jp/web/pub/2007/pdf/kokusai/okada_2007_ko_05.pdf.

Third Generation Partnership Project, 3GPP TR-25.814 V7.1.0, Sep. 2006, Release 7, pp. 71-74.

Third Generation Partnership Project, 3GPP TS 36.211 V8.4.0, Sep. 2008, Release 8, pp. 11-15.

Yokomakura et al., "A Spectrum-Overlapped Resource Management in Dynamic Spectrum Control Technique", Personal, Indoor and Mobile Radio Communications, 2008, PIMRC 2008, IEEE 19th International Symposium.

Yokomakura et al., "A Spectrum-Overlapped Resource Management Using Dynamic Spectrum Control Technique", Proceedings of the 2008 IEICE General Conference Tsushin 1, Mar. 5, 2008, p. 437, B-5-51.

Yokomakura et al., "A Spectrum-Overlapped Resource Management Using Dynamic Spectrum Control", Proceedings of the 2008 IEICE General Conference, The Institute of Electronics, Information and Communication Engineers, Mar. 18-21, 2008.

\* cited by examiner

FIG.3
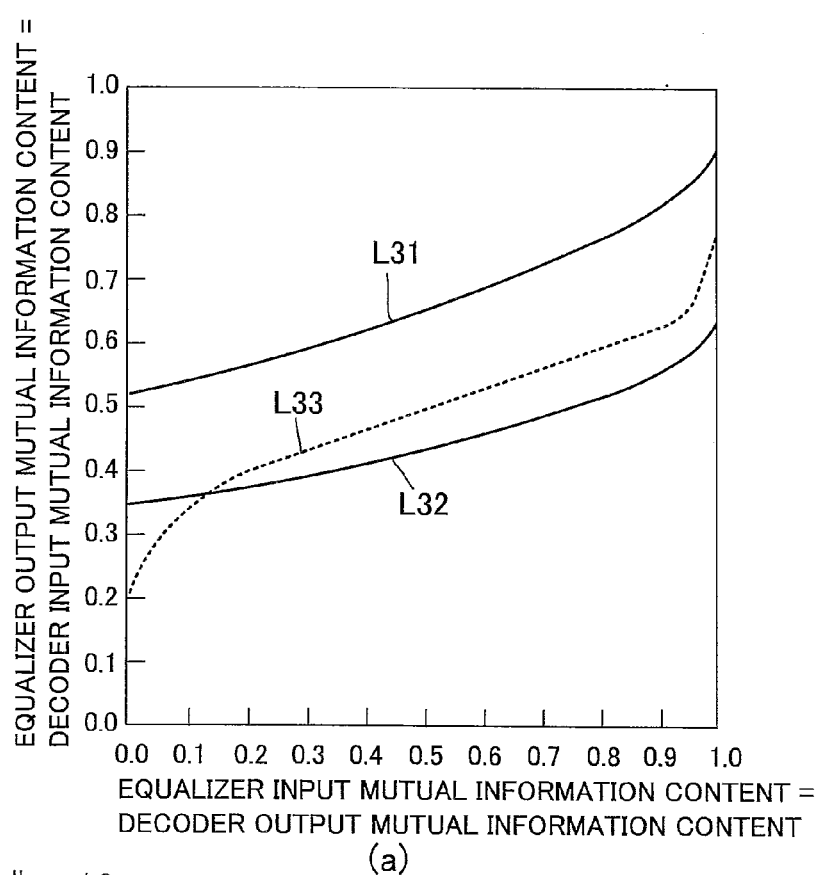
(a)
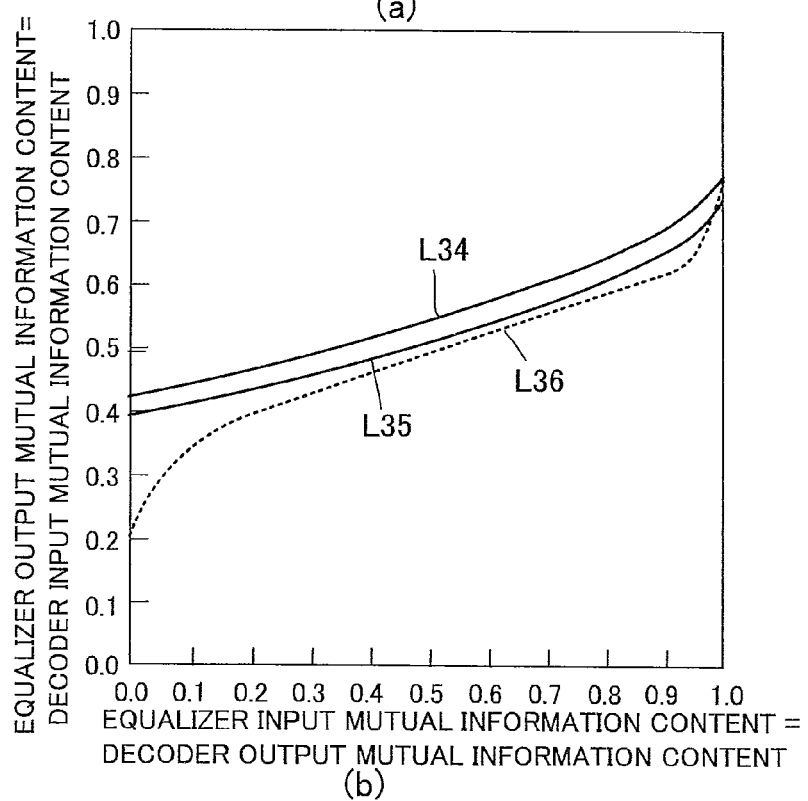
(b)

FIG.11
PRIOR ART
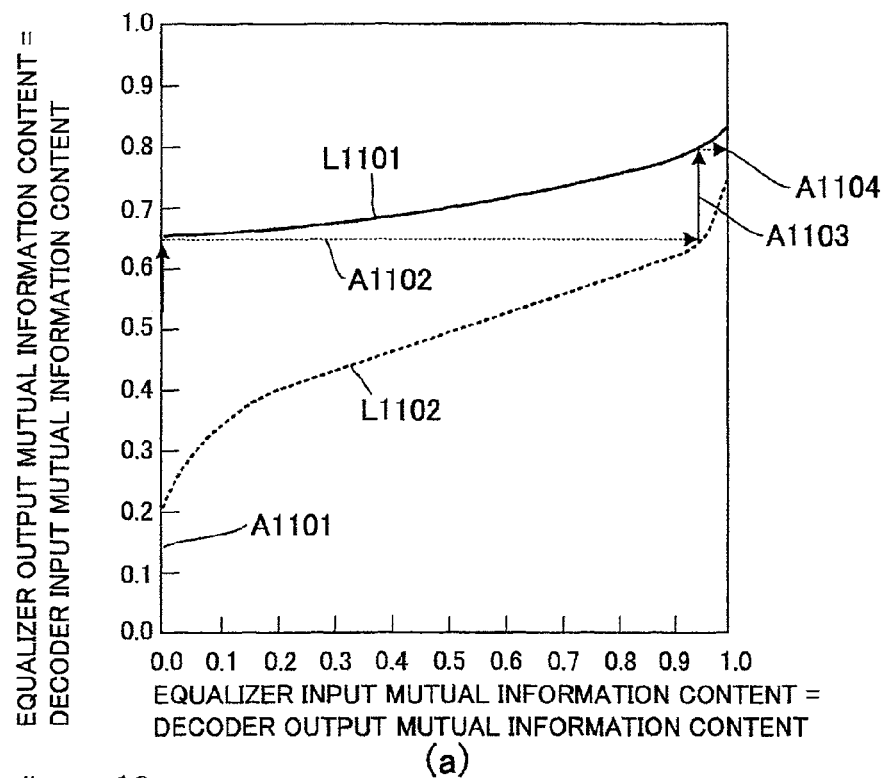
(a)
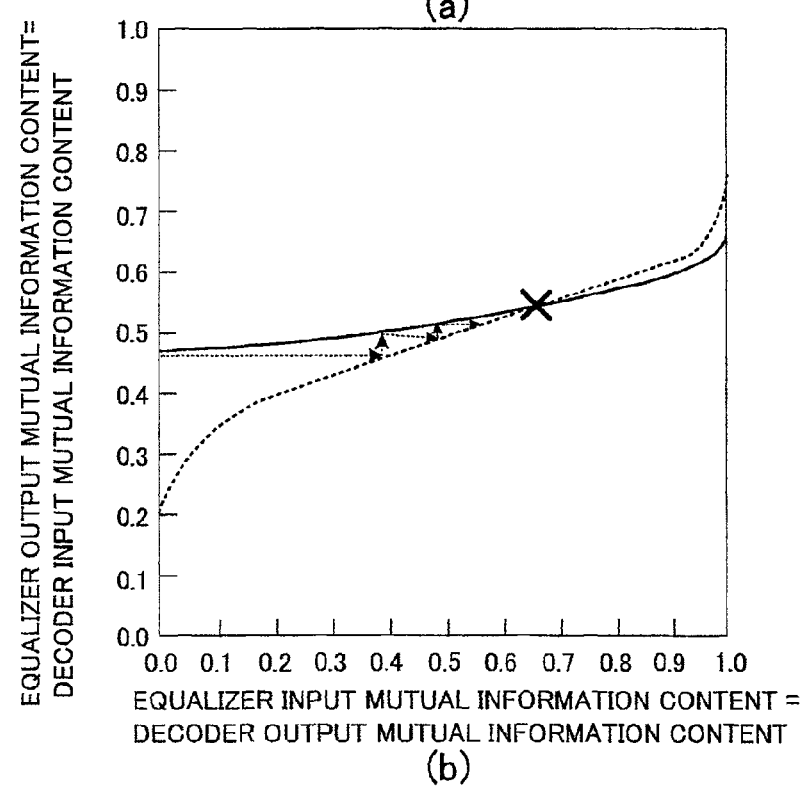
(b)

RADIO COMMUNICATION SYSTEM, TRANSMISSION DEVICE, RECEPTION DEVICE, AND COMMUNICATION METHOD

FIELD OF THE INVENTION

The present invention relates to a radio communication system, a transmission device, a reception device, and a communication method controlling a clipping rate in spectrum shaping according to a propagation path in a radio communication system in which communication is performed using a frequency spread signal, such as an SC-FDMA system.

BACKGROUND ART

In recent years, a lot of research have been made on a next generation mobile communication system, and as a system for improving the frequency use efficiency of the system, a single frequency reuse cellular system has been proposed that each cell uses the same frequency band so that each cell can use the entire band allocated to the system.

In a downlink (communication from a base station device to a mobile station), an OFDMA (Orthogonal Frequency Division Multiple Access: orthogonal frequency division multiple access) system is the most available candidate. The OFDMA system is such a system that communication is performed by allocating radio resources configured in the time and frequency domains for a plurality of mobile terminal devices flexibly with the use of an OFDM signal performing communication by applying different modulation schemes to information data according to a reception state, such as 64 QAM (64-ary Quadrature Amplitude Modulation: 64-ary quadrature amplitude modulation) and BPSK (Binary Phase Shift Keying: binary phase shift keying).

In this case, since the OFDM signal is used, PAPR (Peak to Average Power Ratio: peak to average power ratio) may become very high, and the high peak power does not cause a major problem in downlink communication that relatively has an allowance for a transmission power amplification function, but causes a fatal problem in a mobile terminal in an uplink (communication from a mobile station to a base station device) that has no allowance for the transmission power amplification function. Thus, a communication system based on a single career system having low PAPR is desirable in the uplink.

However, when the single career system is used, it is impossible to perform control according to the reception state by the frequency axis like in the OFDMA system, and therefore, in order to improve the transmission efficiency, an SC-FDMA (Single Carrier-Frequency Division Multiple Access) system in which after recognizing the reception state of the entire system band, a single carrier signal of the time axis is converted into a frequency signal by a time frequency conversion such as discrete fourier transform (DFT: Discrete Fourier Transform) and the frequency signal is mapped to a part of the frequency band with a good reception state is employed as a transmission system of the uplink in a next generation cellular system called LTE (Long Term Evolution).

Further, in the SC-FDMA system, in order to control a signal by discrete frequencies, a part of a waveform at the rear part of a frame having a time longer than a maximum delay time of a delay wave in a radio propagation path with respect to a signal (hereinafter referred to as a frame in this specification) blocked for the time frequency conversion is added to the head of the frame as CP (Cyclic Prefix) and the CP is removed in a reception device, thus making it possible to circulate the effect of the delay wave of the propagation path in the reception frame. This makes it possible to represent an impulse response in the radio propagation path as an equivalently cyclic convolution, and it becomes possible to independently perform signal processing of a value of the discrete frequency signal obtained by the DFT.

Generally, equalization processing for compensating distortion by the radio propagation path is necessary in the SC-FDMA system, but in the case where control by the discrete frequency using CP is enabled as described above, a transmission equalization technology can be cited, wherein, after recognizing the impulse response of the radio propagation path in advance, the reverse characteristics of the frequency response are multiplied by the frequency signal for transmission. In the transmission equalization technology, where the distortion of a received signal has been completely compensated in the reception device, and a large amount of power is allocated to the discrete frequencies with low gain of the propagation path and a small amount of power is allocated to the discrete frequencies with high gain. Thus, in the uplink where a small-sized terminal performs transmission, the transmission efficiency of energy is lowered.

As a spectrum shaping technology for maximizing the reception energy in the reception device from a viewpoint of energy transmission, a water filling principle is widely known in the field of information theory, etc. FIG. 8 shows a concept of the water filling principle.

First, as shown in the same figure (a), if a received signal to noise power ratio is obtained when receiving with the same power for all the frequencies, it is able to be confirmed that the higher the frequency of the received signal to noise power ratio is, the higher the transmission efficiency of energy becomes, and the lower the frequency is, the lower the transmission efficiency of energy becomes.

Next, as shown in the same figure (b), after converting into a received noise to signal power ratio which is an inverse of the received signal to noise power ratio, the straight line P in parallel to the abscissa axis is set to satisfy the following condition with respect to the graph. An area of a part, which is positioned below the straight line P and surrounded by the noise signal power ratio and the straight line P, (a part indicated by the diagonal line of the same figure (b)) is a transmission power Q. At this time, since a difference between the straight line and the noise signal power ratio of each frequency is the transmission power Q of each frequency, it is possible to determine the transmission power to be allocated to each frequency as shown in the same figure (c). This is called a water filling principle since the transmission power distribution is optimum when an amount of water corresponding to the transmission power is poured from the top to the noise signal power ratio of the same figure (b) and a depth of gathered water is set as the transmission power Q.

By applying the water filling principle, clipping processing is applied that a larger amount of energy is allocated to the frequency with high gain of the propagation path and a smaller amount of energy is allocated to the frequency with low gain, further no power is allocated to the frequency with significantly low gain (a part R to which no transmission power is allocated of FIG. 8(*b*)). In this case, while it is possible to maximize the reception energy from a viewpoint of energy, the number of paths (the number of taps) of the impulse response of the propagation path increases and inter-code interference, which is interference of signals in a frame, is highlighted, thus posing a problem that the maximized reception energy can not be utilized as a result.

Against this, in non-linear iterative equalization having an excellent interference prevention function as represented by turbo equalization, on the assumption of error correction coding, reliability is improved with equalization for improving reliability of a transmission bit by removing distortion by the propagation path and decoding for enhancing reliability of the transmission bit by error correction processing, and the improved reliability information is mutually transmitted between an equalizer and a decoder as prior information, which is repeated to realize complete equalization also for a signal to which spectrum shaping has been applied by the water filling principle.

Here, in the spectrum shaping technology using the turbo equalization technology, when iterative processing converges, the turbo equalization enables to completely prevent inter-code interference by the spectrum shaping and the radio propagation path and to combine delay wave components spread on the time axis, thus making it possible to utilize the reception energy maximized by the water filling principle effectively (for example, Non-Patent Literature 2). Here, the convergent state of the iterative processing refers to the state where the enhancement of reliability by equalization and decoding are not stopped halfway and information of the transmission bit is able to be recognized completely.

When the spectrum shaping technology is used on the uplink by a plurality of transmission devices, spectrum shaping by the water filling principle is performed as primary spectrum shaping. At this time, when transmission is performed using the same time and the same frequency band, a part of spectrum overlaps. Accordingly, clipping is performed assuming that a part of frequency (spectrum) for which no clipping is performed by the primary spectrum shaping is used for transmission in other transmission devices, and power is redistributed to the frequency used for transmission. This makes it possible to multiplex signals of transmission devices without reducing a transmission bit rate (for example, Non-Patent Literature 3).

FIG. 9 shows a concept of spectrum shaping by clipping when two transmission devices communicate with a base station. The same figures (a) and (b) show an example of the concept of primary spectrum shaping to maximize reception energy and secondary spectrum shaping to multiplex signals from a plurality of transmission devices, respectively.

First, in the same figure (a), each of the transmission devices performs spectrum shaping based on the water filling principle capable of maximizing the reception energy (overlapping spectrum B101). Then, in the same figure (b), by clipping a part of spectrum as the secondary spectrum shaping (spectrum that is subjected to the clipping C101), it is possible to multiplex signals between the transmission devices so as not to be overlapped. The clipping in the secondary spectrum shaping is performed for the spectrum notified from the base station device. The base station selects the frequency used for transmission successively, the frequency having the highest gain of the propagation path alternately from among discrete frequencies overlapped between transmission devices (so as to avoid overlapping of spectrum among users). After securing a predetermined band, the base station performs scheduling by means of clipping the remaining frequencies and notifies the scheduling result to each of the transmission devices. In this way, when signals of the transmission devices are multiplexed by frequency, the frequency having a good propagation state for a certain user can not be used for transmission, and therefore it can be considered such that spectrum shaping is further performed for the optimum water filling principle to realize both quasi-optimum spectrum shaping and frequency-multiplex of signals.

Next, as to the convergent state when separation and detection of signals by the non-linear iterative equalization are complete, it is known that there is also a non-convergence case but behavior thereof can be performed visually by extrinsic information transfer (EXIT: EXtrinsic Information Transfer) analysis. FIG. 10 shows a block diagram of an analysis model, FIG. 11(a) shows an example of a convergent state, and FIG. 11(b) shows an example of anon-convergent state. First, in FIG. 10, the analysis model is configured by an equalizer 1101 and a decoder 1102, serving as a model in which improved reliability is transmitted mutually. At this time, in the equalizer 1101, equalization processing needs a received signal, propagation path characteristics, an average received signal to noise power ratio, and reliability obtained by the decoder 1102. On the other hand, in the decoder 1102, reliability of the transmission bit obtained by the equalizer 1101 is input and error correction processing is applied so that improved reliability is output.

The EXIT analysis is illustrated with input and output characteristics of mutual information (MI: Mutual Information) in order to represent mutually improved reliability of the transmission bit quantitatively. First, mutually transmitted in the turbo equalization processing technology is a log likelihood ratio (LLR: Log Likelihood Ratio) of the transmission bit that natural logarithm (logarithm whose base is e (Napier's constant)) is obtained for a ratio of the probability that the transmission bit is 1 to the probability that the transmission bit is 0. Here, MI related to the transmission bit obtained from LLR is constrained to 0 to 1, and 0 shows that no information related to the transmission bit is obtained at all and 1 shows that information related to the transmission bit is completely obtained.

This is shown in FIGS. 11(a) and (b) as input and output characteristics of the equalizer 1101 and the decoder 1102. In these figures, the abscissa axis shows the input MI of the equalizer and the ordinate axis shows the output MI of the equalizer. This also means that since the output MI of the equalizer is the input MI of the decoder in the turbo equalization, the axes of the input and output MI characteristics of the decoder and the input and output MI characteristics of the equalizer are reversed in the same graph.

First, FIG. 11(a) illustrates the convergent state of iterative processing, where L1101 shows the input and output characteristics of the equalizer and L1102 shows the input and output characteristics of the decoder. In the same figure, starting from an origin, since there is no prior information at first, the MI is obtained by the equalization processing as shown by A1101. Next, since the MI obtained by the equalization processing is the input MI of the decoder, advance is made horizontally as shown by A1102 so that improvement is obtained by error correction. Similarly, when tracks are drawn in the order of A1103 and A1104, respective input and output characteristics will be not crossed, thus 1 is eventually obtained in the output MI of the decoder, and enabling to recognize the transmission bit completely. On the other hand, in FIG. 11(b), respective input and output characteristics are crossed, and when drawing tracks, no improvement is made at the intersection point. This state is called stack in which a detection error is not eliminated even after repetitions based on the turbo principle and the iterative processing is brought into the non-convergent state.

This is because of the propagation path which is changing momentarily. Aiming to deal therewith, an adaptive coding modulation scheme has been also proposed, wherein, from among the combinations of a modulation scheme resulting in the convergent state and an encoding ratio of error correction coding, a combination of the modulation scheme and the encoding ratio allowing to transmit most information bits is adaptively selected (for example, Non-Patent Literature 4).

KNOWN ART LITERATURES

Non-Patent Literatures

Non-Patent Literature 1: 3GPP TR 25.814 V.7.1.0, "Physical layer aspects for evolved Universal Terrestrial Radio Access (UTRA) Release 7," September 2006.

Non-Patent Literature 2: Okada, Ibi, and Sampei, "A Proposal on Spectrum Shaping exploiting Frequency Clipping for Turbo Equalization", Technical Report of The Institute of Electronics, Information and Communication Engineers, Wireless Communication System Research Academy, RCS2006-258, March 2007.

Non-Patent Literature 3: A. Okada, S. Ibi and S. Sampei, "Spectrum Shaping Technique Combined with SC/MMSE Turbo Equalizer for High Spectral Efficient Broadband Wireless Access Systems," ICSPCS2007, Gold Coast, Australia, December 2007.

Non-Patent Literature 4: S. IBI, T. Matsumoto, R. Thoma, S. Sampei, and N. Morinaga, "EXIT Chart-Aided Adaptive Coding for MMSE Turbo Equalization with Multilevel BICM infrequency Selective MIMO Channels", IEEE Trans. VT, Vol. 56, No. 6, pp. 3749-3756. November 2007.

SUMMARY OF THE INVENTION

Problems to be Solved by the Invention

However, the adaptive coding modulation scheme is a system in which the number of bits transmitted changes for each frame, and especially when the state of the propagation path is worse, an amount of information that can be transmitted is reduced, thus posing a problem that a transmission rate is unstable.

Further, when the signals of a plurality of transmission devices are multiplexed, shaping is performed so as to multiplex with frequencies by clipping or overlapping is allowed as inter-user interference. However, these processing is likely to come close to the non-convergent state. In particular, when overlapping is allowed, there is a problem that the inter-user interference is incomplete and the detection accuracy of signals from all transmission devices is deteriorated.

The present invention has been made in view of the foregoing, and an object thereof is to provide a radio communication system, a transmission device, a reception device, and a communication method controlling a clipping rate in spectrum shaping according to a propagation path to thereby improve transmission characteristics and perform communication at a stable transmission rate.

Means to Solve the Problem

The present invention has been made to solve the problems described above, and is a radio communication system including a plurality of transmission devices that spread a frequency of a transmitting signal, allocate the frequency spread signal to discrete frequencies, and apply spectrum shaping including at least clipping to the allocated signal for transmission; and a reception device that receives the transmitting signal; wherein the reception device generates transmission path information related to propagation path characteristics between all the transmission devices and the reception device and clipping information related to a clipping rate of spectrum adaptively controlled according to the propagation path characteristics based on the transmitting signal to feed back to the transmission devices, and the transmission device adaptively controls the clipping rate according to the propagation path characteristics between all the transmission devices and the reception device, based on the transmission path information and the clipping information which are fed back, so as to apply spectrum shaping, and performs multiplexing by frequency.

Furthermore, in the present invention, a radio communication system including a plurality of transmission devices that spread a frequency of a transmitting signal, allocate the frequency spread signal to discrete frequencies, and apply spectrum shaping including at least clipping to the allocated signal for transmission; and a reception device that receives the transmitting signal, is characterized in that the reception device generates transmission path information related to propagation path characteristics between all the transmission devices and the reception device, clipping information related to a clipping rate of spectrum adaptively controlled according to the propagation path characteristics and an encoding ratio of error correction coding of the received signal, and encoding information related to the encoding ratio to feed back to the transmission device, and the transmission device adaptively controls the clipping rate according to the propagation path characteristics between all the transmission devices and the reception device based on the transmission path information, the clipping information and the encoding information which are fed back, controls the encoding ratio of the error correction coding in the transmission device according to the clipping rate to apply spectrum shaping, and performs multiplexing by frequency.

Furthermore, the radio communication system of the present invention is any of the above-described radio communication systems and characterized in that the transmission device does not cause spectrum to overlap with a transmitting signal of other transmission device by clipping.

Furthermore, the radio communication system of the present invention is any of the above-described radio communication systems and characterized in that the transmission device causes a part of spectrum to overlap with a transmitting signal of other transmission device by clipping.

Furthermore, the radio communication system of the present invention is any of the above-described radio communication systems and characterized in that the transmission device includes a primary spectrum shaping unit that distributes power so that reception energy increases based on the propagation path characteristics information, and a secondary spectrum shaping unit that applies at least clipping based on the clipping information, and characterized in that the reception device includes a propagation path estimation unit that estimates propagation path characteristics which are frequency response characteristics of a propagation path from the transmission device to the reception device, a scheduling unit that determines the clipping rate of each transmission device based on the propagation path characteristics, a spectrum extracting unit that extracts a frequency spread signal of the transmission device from the received signal based on the spectrum allocation information, a soft cancel unit that at least cancels a replica of the transmitting signal from the signal extracted by the spectrum extracting unit, an equalization unit that detects a transmitting signal transmitted by the transmission device for an output from the soft cancel unit, a demodulating unit that extracts information related to coding data from the detected signal, a decoding unit that performs error correction processing for information related to the extracted coding data to renew the information, a soft replica generation unit that generates a replica of the transmitting signal from information related to the renewed coding data, an equivalent propagation path characteristic multiplication unit that generates a receiving signal replica with even an effect of spectrum shaping applied in the transmission device as the propagation path characteristics, and an information generation unit that generates propagation path information related to the propagation path characteristics estimated by the propagation path estimation unit and clipping information related to the clipping rate determined by the scheduling unit to feed back to the transmission device.

Furthermore, the radio communication system of the present invention is the above-described radio communication system and characterized in that the transmission device includes an encoding unit that encodes a transmitting signal based on the encoding information, a primary spectrum shaping unit that distributes power in such a manner that reception energy increases based on the propagation path characteristic information, and a secondary spectrum shaping unit that applies at least clipping based on the clipping information, and the reception device includes a propagation path estimation unit that estimates propagation path characteristics which are frequency response characteristics of the propagation path from the transmission device to the reception device, a scheduling unit that determines an encoding ratio of error correction coding of a received signal and the clipping rate of each transmission device by the encoding ratio based on the propagation path characteristics, a spectrum extracting unit that extracts a frequency spread signal of each transmission device from the received signal based on the spectrum allocation information, a soft cancel unit that at least cancels a replica of the transmitting signal from the signal extracted by the spectrum extracting unit, an equalization unit that detects a transmitting signal transmitted by the transmission device for an output from the soft cancel unit, a demodulating unit that extracts information related to coding data from the detected signal, a decoding unit that performs error correction processing for information related to the extracted coding data to renew the information, a soft replica generation unit that generates a replica of the transmitting signal from information related to the renewed coding data, an equivalent propagation path characteristic multiplication unit that generates a receiving signal replica with even an effect of spectrum shaping applied in the transmission device as the propagation path characteristics, and an information generation unit that generates propagation path information related to the propagation path characteristics estimated by the propagation path estimation unit, encoding information related to the encoding ratio determined by the scheduling unit, and clipping information related to the clipping rate to feed back to the transmission device.

Furthermore, the radio communication system of the present invention is the above-described radio communication system and characterized in that the scheduling unit determines the encoding ratio according to decoding characteristics of the decoding unit by the encoding ratio.

Furthermore, the radio communication system of the present invention is any of the above-described radio communication systems and characterized in that the scheduling unit determines the clipping rate based on an EXIT chart calculated from mutual information of input and output characteristics of the equalization unit.

Furthermore, the radio communication system of the present invention is the above-described radio communication system and characterized in that, as for equalization characteristics between at least two transmission devices and at least one reception device, the equalization characteristics including first equalization characteristics regarding a first transmission device and second equalization characteristics regarding the second transmission device, the scheduling unit obtains a difference of mutual information using the first equalization characteristics and the second equalization characteristics, increases a clipping rate of the second transmission device or decreases a clipping rate of the first transmission device when the difference is positive, and decreases the clipping rate of the second transmission device or the clipping rate of the first transmission device when the difference is negative.

Furthermore, in the present invention, a plurality of transmission devices that spread a frequency of a transmitting signal, allocate the frequency spread signal to discrete frequencies, and apply spectrum shaping to the allocated signal to transmit to a reception device, including a primary spectrum shaping unit that distributes power in such a manner that reception energy increases based on transmission path information related to propagation path characteristics, between the transmission devices and the reception device, which are fed back from the reception device, and a secondary spectrum shaping unit that applies at least clipping based on clipping information related to a clipping rate of spectrum adaptively controlled according to the propagation path characteristics which are fed back from the reception device, are characterized in that the spectrum shaping is adaptively applied according to the propagation path characteristics between all the transmission devices and the reception device, and multiplexing thereto is performed by frequency.

Furthermore, in the present invention, a plurality of transmission devices that spread a frequency of a transmitting signal, allocate the frequency spread signal to discrete frequencies, and apply spectrum shaping to the allocated signal to transmit to a reception device, including a primary spectrum shaping unit that distributes power in such a manner that reception energy increases based on transmission path information related to propagation path characteristics between the transmission devices and the reception device which are fed back from the reception device, and a secondary spectrum shaping unit that applies at least clipping based on clipping information related to a clipping rate of spectrum adaptively controlled according to the propagation path characteristics which are fed back from the reception device and encoding ratio of error correction coding of a received signal, and characterized in that spectrum shaping is adaptively applied according to the propagation path characteristics between all the transmission devices and the reception device and the encoding ratio, and multiplexing thereto is performed by frequency.

Furthermore, in the invention, a reception device is a reception device that receives a signal from a transmission device provided with a primary spectrum shaping unit that distributes power in such a manner that reception energy increases and a secondary spectrum shaping unit that applies at least clipping, allocating a frequency spread signal to discrete frequencies, and applying spectrum shaping to the allocated signal for transmission, the reception device including: a propagation path estimation unit that estimates propagation path characteristics which are frequency response characteristics of a propagation path from the transmission device to the reception device, a scheduling unit that determines the clipping rate of each transmission device based on the propagation path characteristics, a spectrum extracting unit that extracts a frequency spread signal of the transmission device from a received signal based on the spectrum allocation information, a soft cancel unit that at least cancels a replica of the transmitting signal from the signal extracted by the spectrum extracting unit, an equalization unit that detects a transmitting signal transmitted by the transmission device for an output from the soft cancel unit, a demodulating unit that extracts information related to coding data from the detected signal, a decoding unit that performs error correction processing for information related to the extracted coding data to renew the information, a soft replica generation unit that generates a replica of the transmitting signal from information related to the renewed coding data, an equivalent propagation path characteristic multiplication unit that generates a receiving signal replica with even an effect of spectrum shaping applied in the transmission device as the propagation path characteristics, and an information generation unit that generates propagation path information related to the propagation path characteristics estimated by the propagation path estimation unit and clipping information related to the clipping rate determined by the scheduling unit to feed back to the transmission device.

Furthermore, in the present invention, a reception device that receives a signal from a transmission device provided with a primary spectrum shaping unit that distributes power in such a manner that reception energy increases and a secondary spectrum shaping unit that applies at least clipping, allocating a frequency spread signal to discrete frequencies, and applying spectrum shaping to the allocated signal for transmission, the reception device including: a propagation path estimation unit that estimates propagation path characteristics which are frequency response characteristics of a propagation path from the transmission device to the reception device, a scheduling unit that determines an encoding ratio of error correction coding of a received signal and the clipping rate of each transmission device by the encoding ratio based on the propagation path characteristics, a spectrum extracting unit that extracts a frequency spread signal of the transmission device from a received signal based on the spectrum allocation information, a soft cancel unit that at least cancels a replica of the transmitting signal from the signal extracted by the spectrum extracting unit, an equalization unit that detects a transmitting signal transmitted by the transmission device for an output from the soft cancel unit, a demodulating unit that extracts information related to coding data from the detected signal, a decoding unit that performs error correction processing for information related to the extracted coding data to renew the information, a soft replica generation unit that generates a replica of the transmitting signal from information with even the renewed coding data, an equivalent propagation path characteristic multiplication unit that generates a receiving signal replica with even an effect of spectrum shaping applied in the transmission device as the propagation path characteristics, and an information generation unit that generates propagation path information related to the propagation path characteristics estimated by the propagation path estimation unit, encoding information related to the encoding ratio determined by the scheduling unit, and clipping information related to the clipping rate to feed back to the transmission device.

Furthermore, the reception device of the present invention is any of the above-described reception devices and characterized in that the scheduling unit determines the clipping rate based on an EXIT chart calculated from the propagation path characteristics.

Furthermore, the reception device of the present invention is any of the above-described receiving devices and characterized in that the scheduling unit includes means for calculating a difference of mutual information in an initial state of the EXIT chart calculated from the propagation path characteristics and an initial value of the clipping rate, and judging whether the difference is positive, means for increasing the clipping rate when the difference is positive, and decreasing the clipping rate when the difference is negative, means for setting a difference of mutual information in a state before transition and a difference of the mutual information in a state after transition for a combination of clipping rates in a determined following state and comparing the differences in size, and means for setting the state before transition as an optimum clipping rate when the difference of the mutual information in the state before transition is smaller, and repeating processing to judge the difference of the mutual information again with the state after transition as the state before transition when, on the other hand, the difference of the mutual information in the state after transition is larger.

Furthermore, in the present invention, a communication method of a radio communication system including a plurality of transmission devices that spread a frequency of a transmitting signal, allocate the frequency spread signal to discrete frequencies, and apply spectrum shaping including at least clipping to the allocated signal, and a reception device that receives the transmitting signal, is characterized in that the reception device generates transmission path information related to propagation path characteristics between all the transmission devices and the reception device and clipping information related to a clipping rate of spectrum adaptively controlled according to the propagation path characteristics based on the transmitting signal to feed back to the transmission device, and the transmission device adaptively controls the clipping rate according to the propagation path characteristics between all the transmission devices and the reception device based on the transmission path information and the clipping information which are fed back to apply spectrum shaping, and performs multiplexing by frequency.

Further, in the present invention, a communication method of a radio communication system including a plurality of transmission devices that spread a frequency of a transmitting signal, allocate the frequency spread signal to discrete frequencies, and apply spectrum shaping including at least clipping to the allocated signal, and a reception device that receives the transmitting signal, is characterized in that the reception device generates transmission path information related to propagation path characteristics between all the transmission devices and the reception device, clipping information related to a clipping rate of spectrum adaptively controlled according to the propagation path characteristics and an encoding ratio of error correction coding of the received signal, and encoding information related to the encoding ratio to feed back to the transmission device, and the transmission device adaptively controls the clipping rate according to the propagation path characteristics between all the transmission devices and the reception device based on the transmission path information, the clipping information and the encoding information which are fed back, controls the encoding ratio of the error correction coding in the transmission device according to the clipping rate to apply spectrum shaping, and performs multiplexing by frequency.

Furthermore, the communication method of the present invention is any of the above-described communication methods and characterized in that the transmission device does not cause spectrum to overlap with a transmitting signal of other transmission device by clipping.

Furthermore, the communication method of the present invention is any of the above-described communication methods and characterized in that the transmission device does not cause a part of spectrum to overlap with a transmitting signal of other transmission device by clipping.

Furthermore, the communication method of the present invention is any of the above-described communication methods and characterized in that the clipping rate is determined based on an EXIT chart calculated from the propagation path characteristics.

Furthermore, the communication method of the present invention is the above-described communication method and characterized in that, as for the clipping rate, a step of calculating a difference of mutual information in an initial state using the EXIT chart calculated by the propagation path characteristics and an initial value of the clipping rate, and judging whether the difference is positive, a step of increasing the clipping rate when the difference is positive, and decreasing the clipping rate when the difference is negative, a step of setting a difference of mutual information in a state before transition and a difference of mutual information in a state after transition for a combination of clipping rates in a determined following state, and comparing the differences in size, and a step of setting the state before transition as an optimum clipping rate when the difference of the mutual information in the state before transition is smaller, and returning to a step of judging the difference of the mutual information again with the state after transition as the state before transition when, on the other hand, the difference of the mutual information in the state after transition is larger, are included.

EFFECT OF THE INVENTION

According to the present invention, a clipping rate is increased according to a propagation path which is changing momentarily or frequency subjected to clipping is allocated for transmission to thereby reduce the clipping rate, thus making it possible to secure a convergent state of iterative control and to transmit information at a stable transmission rate while increasing a transmission amount of energy.

According to the present invention, it is possible to overlap a part of spectrum, thus enabling not only to transmit using frequency with a better reception state but also to transmit a lot of information with less amount of frequency resource by overlapping.

BRIEF DESCRIPTION OF THE DRAWINGS

FIG. 3 shows input and output characteristics of an equalizer and a decoder, where (a) shows an example of an EXIT chart in a receiving signal of each transmission device in a case where clipping is made for spectrum at a rate of 50% by secondary spectrum shaping and (b) shows an example of the EXIT chart in a receiving signal in a case where a clipping rate is changed in a signal of a transmission device 1 and a signal of a transmission 2 to be an optimum clipping rate.

FIG. 11 shows input and output characteristics of an equalizer and a decoder, where (a) shows an example of a convergent state when separation and detection of signals by non-linear iterative equalization are complete and (b) shows an example of a non-convergent state.

BEST MODE FOR CARRYING OUT THE INVENTION

Hereinafter, description will be given for embodiments of the present invention with reference to accompanying drawings.

In the following embodiments, description will be given with the number of transmission devices as 2. In the embodiments shown below, unless otherwise noted, an uplink communication is aimed at communication from a mobile station to a base station commonly referred, however, communication intended for the present invention is not limited thereto. Note that, the mobile station is represented as the above-described transmission device. Additionally, frequency domain SC/MMSE (Soft Canceller with Minimum Mean Square Error) turbo equalization is used as a non-linear iterative equalization technology having an interference prevention function, however, a case of non-linear iterative equalization having an interference prevention function non-linear iterative equalization having an interference prevention function is essentially identical without limitation.

[First Embodiment]

Figure 1:
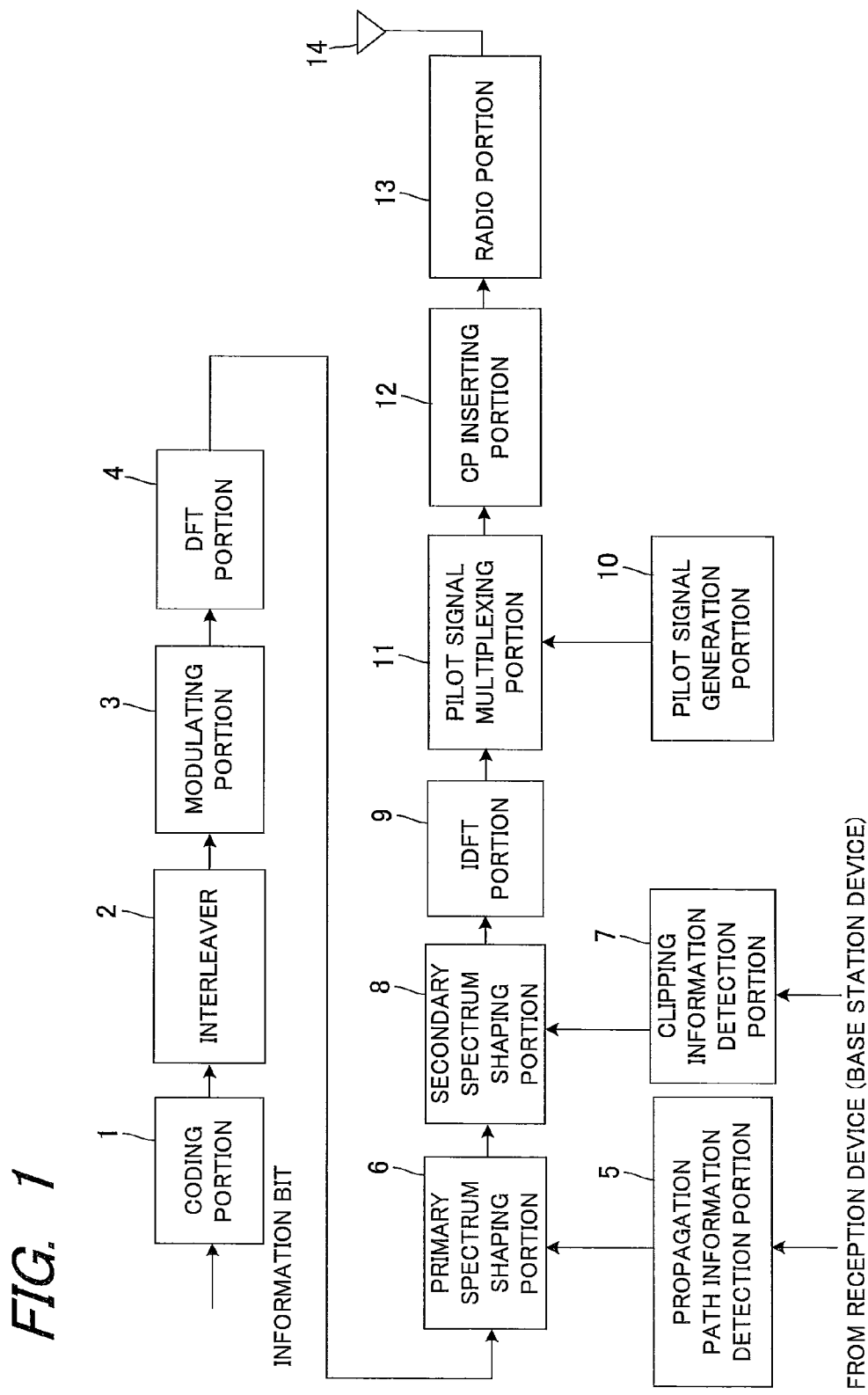
FIG. 1 is a block diagram showing a first embodiment of a transmission device according to the present invention.

As a first embodiment, description will be given for a case where a rate at which spectrum is subjected to clipping without permitting overlapping is adaptively controlled. An example of the transmission device (a mobile station device) is shown in FIG. 1. The transmission device is comprised of a coding unit 1, an interleaver 2, a modulating unit 3, a DFT unit 4, a propagation path information detection unit 5, a primary spectrum shaping unit 6, a clipping information detection unit 7, a secondary spectrum shaping unit 8, an IDFT (Inverse DFT) unit 9, a pilot signal generation unit 10, a pilot signal multiplexing unit 11, a CP inserting unit 12, a radio unit 13 and a transmission antenna 14.

First, information bit is error-correction-encoded in the coding unit 1, and the obtained coding bit is rearranged in the interleaver 2. The interleaved coding bit is modulated in the modulating unit 3 and converted into a frequency signal by the DFT unit 4. On the other hand, propagation path characteristics are detected by the propagation path information detection unit 5 for detecting information related to the propagation path characteristics (propagation path information) that are fed back from the base station device (reception device), and a water filling principle for distributing energy by the primary spectrum shaping unit 6 according to the propagation path characteristics is applied to transmission spectrum obtained by the DFT unit 4.

Next, clipping information of the secondary spectrum shaping that is determined based on scheduling of the base station device that is fed back from the base station device is detected by the clipping information detection unit 7, and the secondary spectrum shaping is performed by the secondary spectrum shaping unit 8. Thereafter, reconversion into a time signal is made by the IDFT unit 9. Then, a pilot signal is generated for estimating the propagation path characteristics by the pilot signal generation unit 10 to be multiplexed with the time signal that is output from the IDFT unit 9 by the pilot signal multiplexing unit 11. Thereafter, a CP is added to the multiplexed transmitting signal by the CP inserting unit 12 to be up-converted into radio frequency by the radio unit 13, and is transmitted by the transmission antenna 14. Each transmission device is performed in the same manner. Note that, explanation was made here for the case of the water filling principle in the primary spectrum shaping unit 6, however, the shaping in which reception energy increases is also essentially the identical technology, and thus is not limited to the water filling principle.

Figure 2:
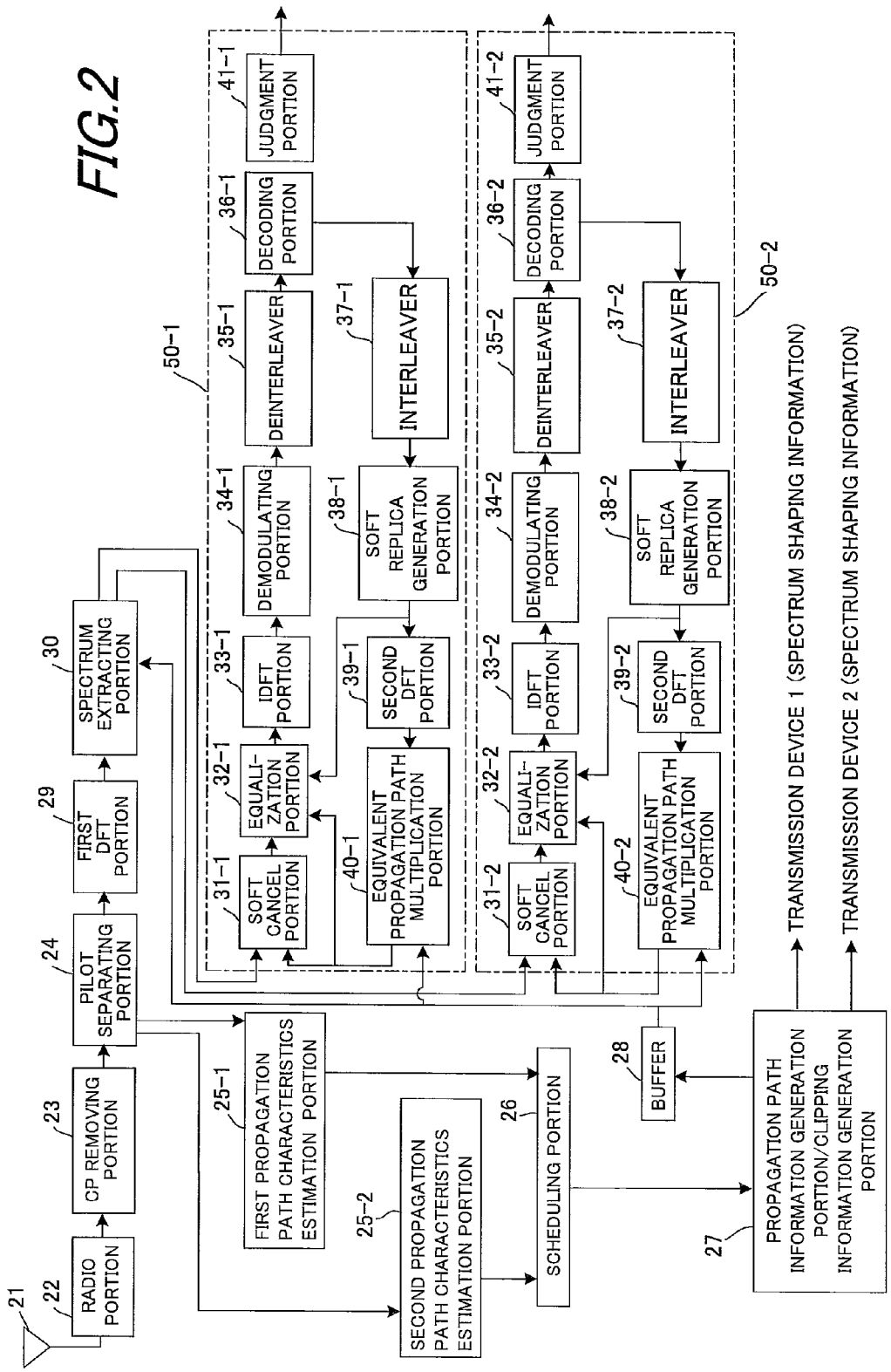
FIG. 2 is a block diagram showing the first embodiment of a reception device according to the present invention.

An example of the reception device is shown in FIG. 2. The reception device is comprised of a reception antenna 21, a radio unit 22, a CP removing unit 23, a pilot separating unit 24, a first propagation path estimation unit 25-1, a second propagation path estimation unit 25-2, a scheduling unit 26, a propagation path information generation unit/clipping information generation unit 27, a buffer 28, a first DFT unit 29, a spectrum extracting unit 30, soft cancel units 31-1 and 31-2, equalization units 32-1 and 32-2, IDFT units 33-1 and 33-2, demodulating units 34-1 and 34-2, deinterleavers 35-1 and 35-2, decoding units 36-1 and 36-2, interleavers 37-1 and 37-2, soft replica generation units 38-1 and 38-2, second DFT units 39-1 and 39-2, equivalent propagation path multiplication units 40-1 and 40-2, and judgment units 41-1 and 41-2. Here, a block of 50-1 is a block for detecting only a signal from the first transmission device, and a block 50-2 is a block for detecting only a signal from the second transmission device.

Receiving signals transmitted from two transmission devices are received with the reception antenna 21 at the same time in the reception device to down-convert into a baseband from radio frequency in the radio unit 22. Next, a CP is removed in the CP removing unit 23 to be input into the pilot separating unit 24. A pilot signal and a data signal from each transmission device are separated from a received signal in the pilot separating unit 24, and the separated pilot signal estimates a frequency response of a propagation path from respective transmission devices to reception devices in the first propagation path estimation unit 25-1 and the second propagation path estimation unit 25-2. The water filling principle and a clipping rate in each transmission device are determined based on estimation values of the propagation path estimation units 25-1 and 25-2 in the scheduling unit 26, information related to the propagation path characteristics and information related to the clipping rate are generated in the propagation path information generation unit/clipping information generation unit 27 and be converted into a signal for feeding back to each transmission device to be transmitted to the transmission device. At the same time, the information related to the propagation path characteristics and the information related to the clipping rate are kept in the buffer 28 in order to be used when detecting a signal of a next frame.

Here, description will be given for power distribution and a clipping method upon the water filling principle. Transmission power to be allocated to the k-th discrete frequency in the u-th transmission device is expressed by a formula (1).

[Formula 1]

$$m_u(k) = \left(\xi - \frac{N_0}{\Xi_u(k)\Xi_u^*(k)}\right)^+ \quad (1)$$

Wherein, $m_u(k)$ is transmission power of an actual number allocated to the k-th discrete frequency, $N_0$ is noise power density, $\Xi_u(k)$ is the complex gain of the propagation path in the k-th discrete frequency, and $\Xi^*_u(k)$ is the complex conjugate of $\Xi(k)$. Additionally, $\xi$ is a common value of all discrete frequencies. The common value is used for transmission determined according to the total transmission power. $(x)^+$ is a clipping operator thereby 0 is output when x is smaller than 0 and x is output when x is 0 or more. Note that, description is given here for what is based on the water filling principle, however, any processing that a large amount of power is allocated for spectrum of a good reception state for increasing reception energy is essentially identical, and a primary spectrum control is thus not limited to the water filling principle.

To the transmission power of each frequency obtained in this manner, additional clipping is further applied in the secondary spectrum shaping unit so as not to be overlapped between respective transmission devices. Here, the clipping is alternately performed from the smallest gain of the propagation path of discrete frequencies which are overlapped. Receiving processing is performed, wherein the gain for a frequency signal applied by this spectrum shaping processing is regarded as the gain of the propagation path in the base station device. At this time, the gain of the propagation path is regarded as zero for a signal of discrete frequency which is subjected to the clipping.

On the other hand, the data signal that is separated in the pilot separating unit 24 is converted into a frequency signal in the first DFT unit 29, and a signal from each transmission device is separated by using information related to the clipping rate in the previous frame being kept in the buffer 28 in the spectrum extracting unit 30. The signals from respective transmission devices which are separated are input into the soft cancel units 31-1 and 31-2 respectively, and receiving signal replicas that are output from the equivalent propagation path multiplication units 40-1 and 40-2 to be described later are cancelled. However, the receiving signal replicas are not obtained at the first time, therefore nothing is cancelled.

Next, each signal that is output from the soft cancel units 31-1 and 31-2 is applied with equalization of the frequency domain in the equalization units 32-1 and 32-2, and a received signal after equalization is output. Then, each signal after equalization is converted into a time domain in the IDFT units 33-1 and 33-2, and input into the demodulating units 34-1 and 34-2, and decomposed to an LLR of the coding bit. Arrangement of the obtained LLR of the coding bit is returned to the original arrangement by the deinterleavers 35-1 and 35-2 to be applied with error correction processing by the decoding units 36-1 and 36-2, and the LLR with higher reliability is output. The output LLR is rearranged by the interleavers 37-1 and 37-2, and a replica of a transmitting signal having an amplitude in proportion to the reliability is generated by the soft replica generation units 38-1 and 38-2. Here, a modulation scheme serves as quaternary phase shift keying (QPSK: Quaternary Phase Shift Keying), and when 1 bit-th and 2 bit-th LLRs of the coding bit constituting a QPSK symbol are $\lambda_1$ and $\lambda_2$ respectively, a soft replica $s_{soft}$ is expressed by a formula (2).

[Formula 2]

$$s_{soft} = \frac{1}{\sqrt{2}}\tanh\left(\frac{\lambda_1}{2}\right) + j\frac{1}{\sqrt{2}}\tanh\left(\frac{\lambda_2}{2}\right) \quad (2)$$

Wherein, j is an imaginary unit satisfying $j^2=-1$.

Next, the soft replica obtained in a manner of the formula (2) is input into the equalization units 32-1 and 32-2 because of the necessity for calculation of a received signal after equalization, as well as is input into the second DFT units 39-1 and 39-2 respectively for the soft cancel. Then, gain for a transmitting signal including even the spectrum shaping by the equivalent propagation path multiplication units 40-1 and 40-2 is defined as an equivalent propagation path, and the gain is multiplied so that the receiving signal replica is generated. Gain of the equivalent propagation path that also regards gain by the spectrum shaping on the side of the transmission device as the propagation path is expressed by a formula (3) in the case of the transmission device 1, for example.

[Formula 3]

$$\eta_1(k) = \sqrt{m_1(k)} \Xi_1(k) \quad (3)$$

In the formula (3), $\eta_1(k)$ is equivalent propagation path gain in the k-th discrete frequency expressed as a complex number, $m_1(k)$ is spectrum shaping gain in the k-th discrete frequency calculated by the formula (1), and $\Xi_1(k)$ is propagation path gain of the complex number in the k-th discrete frequency.

In the equivalent propagation path multiplication units 40-1 and 40-2, the equivalent propagation path gain expressed by the formula (3) is multiplied by the transmitting signal replica of a frequency axis to be input into the soft cancel units 31-1 and 31-2 again, which is repeated. This processing is repeated the predetermined times or until errors are not found, and the judgment of the information bit is finally performed by the judgment units 41-1 and 41-2. In this manner, suppression is made regarding as inter-code interference of the propagation path, which includes even inter-code interference generated by the spectrum shaping, so that the information bit can be detected with high energy, and the spectrum missed by clipping can also be reproduced.

Here, description will be given for a method of the secondary spectrum shaping in the above-described scheduling unit 26. In the scheduling unit 26, spectrum that overlaps at the time of applying the primary spectrum shaping is changed so as to use frequencies that are not used by any other transmission devices, however, at this time, the propagation path which is momentarily converting is independent for each of transmission devices, therefore it is important that the clipping rate is made to be adaptable for each of the transmission terminals so as to keep a convergent state of all transmission devices, rather than equally clipping a signal of each transmission device. An EXIT chart is used as a method for achieving this.

An example of clipping equally, where the number of the transmission terminals is two, is shown in FIG. 3. The same figure (a) shows an example of the EXIT chart with regards to a receiving signal of each transmission device, wherein clipping is made for spectrum at a rate of 50% by the secondary spectrum shaping including even clipping by the primary spectrum shaping (water filling principle) indicated as a known art. L31 shows the input and output characteristics of MI of the equalization unit 32-1 which detects a signal of the transmission device 1, L32 shows the input and output characteristics of MI of the equalization unit 32-2 which detects a signal of the transmission device 2, and L33 shows the input and output characteristics of MI in the decoding units 36-1 and 36-2. The same figure indicates that, since the clipping is applied irrespective of a poor state of the propagation path from the transmission device 2 to the base station device, L32 is in a non-convergent state. Consequently, L31 has a distance against characteristics of the decoding units 36-1 and 36-2, and has a redundant capacity of supporting the propagation path for a transmission rate of the error correction coding.

The same figure (b) shows a case where the clipping rate is changed in a signal of the transmission device 1 and a signal of the transmission 2 to obtain an optimum clipping rate. L34 shows the input and output characteristics of MI of the equalization unit 32-1 which detects a signal of the transmission device 1, L35 shows the input and output characteristics of MI of the equalization unit 32-2 which detects a signal of the transmission device 2, and L36 shows the input and output characteristics of MI in the decoding units 36-1 and 36-2, which is the same as L33. In this case, the clipping is insufficiently applied to the transmission device 2 to decrease a rate of performing the clipping. On the other hand, the signal from the transmission device 1 is sufficient, therefore the clipping rate is increased to more than 50%. In this manner, the differences of the input and output characteristics of MI of the equalization unit in each transmission device are decreased, and control is made so as to be easy to keep the convergent state.

Figure 4:
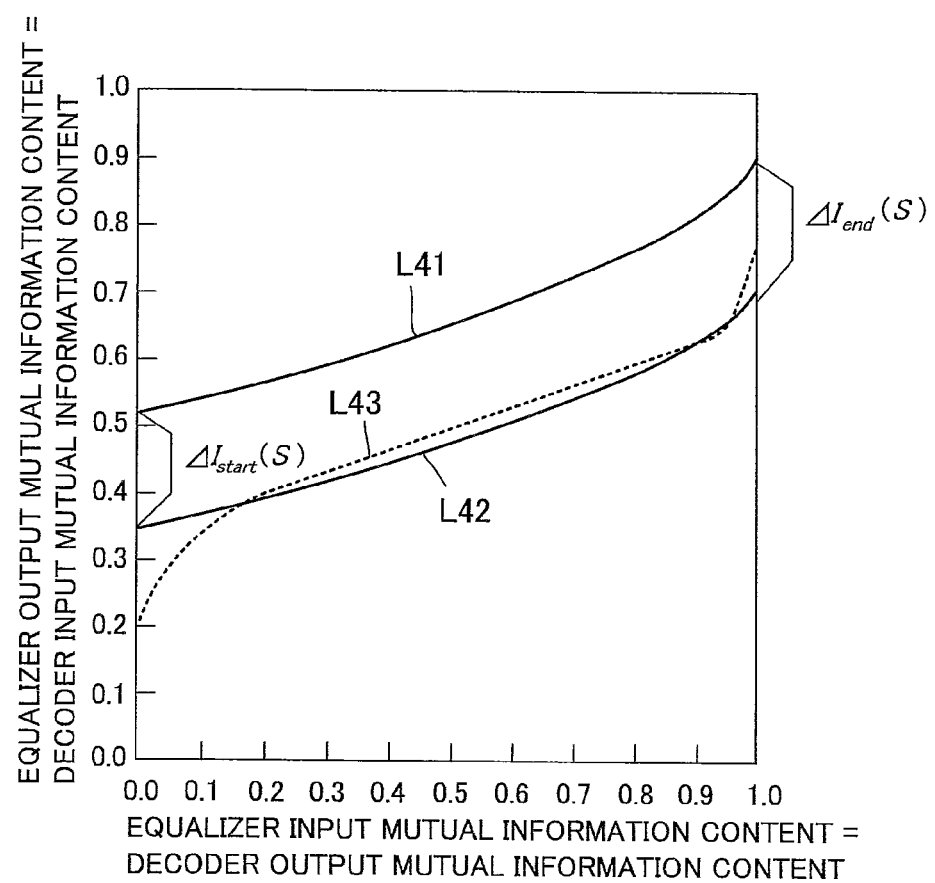
FIG. 4 shows a concept of a method of setting a clipping rate by using an EXIT chart.

Next, description will be given for a method of setting a clipping rate in the scheduling unit 26. A concept of the method of setting a clipping rate by using the EXIT chart is shown in FIG. 4. First, it is assumed that the clipping rate for both of initial states is 50% (state s). L41 shows the input and output characteristics of MI of an equalizer 32-1 for detecting a signal of the transmission device 1 in the initial state s, L42 shows the input and output characteristics of MI of the equalizer 32-2 for detecting a signal of the transmission device 2, and L43 shows the input and output characteristics of MI of decoders 36-1 and 36-2, which are the same as L31, L32 and L33, respectively. At this time, value of a starting point (output MI when an abscissa axis is 0) and an ending point (output MI when the abscissa axis is 1) is calculated, and the smallest difference $\Delta I_{start}$ and $\Delta I_{end}$ is regarded as being optimum. First, an equalization unit output MI for detecting each signal of the transmission devices 1 and 2 in the initial state σ serves as $I^1_{start}(s)$ and $I^2_{start}(s)$, and the ending points serve as $I^1_{end}(s)$ and $I^2_{end}(s)$. A receiving signal to noise power ratio of the equalizer output in the starting point and the ending point of the transmission device 1 is expressed by the following formula.

[Formula 4]

$$SNR^1_{start} = \gamma^1_{start} \quad (4)$$

$$SNR^1_{end} = \frac{\gamma^1_{end}}{1+\gamma^1_{end}} \quad (5)$$

In the formula (4) and the formula (5), $\gamma^1_{start}$ and $\gamma^1_{end}$ are actual numbers in the transmission device 1 shown by the following formulas respectively.

[Formula 5]

$$\gamma^1_{start} = \frac{1}{K}\sum_{k=1}^{K}\left(\frac{|\eta_1(k)|^2}{|\eta_1(k)|^2+N_0}\right) \quad (6)$$

$$\gamma^1_{end} = \frac{1}{N_0 K}\sum_{k=1}^{K}|\eta_1(k)|^2 \quad (7)$$

By using the receiving signal to noise power ratio calculated in a manner of the formula (4) and the formula (5), the output MI of the starting point and the ending point is expressed by the following formulas in the case of QPSK.

[Formula 6]

$$I^1_{start} = (1 - 2^{-H_1(4SNR^1_{start})H_2})H_3 \quad (8)$$

$$I^1_{end} = (1 - 2^{-H_1(4SNR^1_{end})H_2})H_3 \quad (9)$$

Wherein, $H_2$, $H_2$ and $H_3$ are $H_1=0.3073$, $H_2=0.8935$ and $H_3=1.1064$, respectively. Further, the formula (8) and the formula (9) are applicable in the case of BPSK or QPSK, and a constant multiplication 4 of $4SNR^1_{start}$ and $4SNR^1_{end}$ is different according to the modulation scheme in the case of other multi-value modulation scheme. For example, in the case of 16QAM using ML-BICM (Multi-Level Bit Interleaved Coded Modulation) comprised as QPSK of a multilayer, the formula (8) and the formula (9) are 3.2 in a layer 1 and 0.8 in a layer 2 respectively.

MI of the starting point and the ending point are calculated for each of the transmission devices by using the formula (8) and the formula (9). Next, $\Delta I_{start}$ and $\Delta T_{end}$ in the initial state s are defined by a formula (10) and a formula (11).

[Formula 7]

$$\Delta I_{start}(s) = I^1_{start}(s) - I^2_{start}(s) \quad (10)$$

$$\Delta I_{end}(s) = I^1_{end}(s) - I^2_{end}(s) \quad (11)$$

By using a difference calculated in this manner, an indicator expressed by a formula (12) is considered.

[Formula 8]

$$\Delta I(s) = |\Delta I_{start}(s)| + |\Delta I_{end}(s)| \quad (12)$$

The formula (12) shows the sum of difference between the equalization unit output for detecting a signal of the transmission device 1 and the equalization unit output for detecting a signal of the transmission device 2 expressed by the formula (10) and the formula (11) in the initial state s. It means that a characteristic of the equalization unit 32-1 for detecting a signal of the transmission device 1 is located on the upper side of the FIG. 4 at a higher rate when this value is positive, and a characteristic of the equivalent unit 32-2 for detecting a signal of the transmission device 2 is positioned on the upper side of FIG. 4 at a higher rate when the value is negative. Therefore, when this value is positive, the clipping rate of a signal of the transmission device 1 is increased, and the clipping rate of a signal of the transmission device 2 is decreased. On the other hand, the reverse is performed in the case of negative.

Here, when the starting point and the ending point at the time of changing the rate are calculated, for example, the spectrum shaping at the time of the primary spectrum shaping is stored, which is subjected to the clipping temporarily, and the starting point and the ending point are calculated. For example, when 50% of both signals of the transmission devices are subjected to the clipping, spectrum in a worse reception state among the overlapped spectrum is alternately subjected to the clipping in order. Additionally, when the clipping rates for signals of respective transmission terminals are different, such as 60% and 40%, up to 40% is subjected to the clipping alternately, and the transmission device that 60% must be subjected to the clipping is subjected to the clipping for all remained overlapped spectrum. Note that, when both transmission devices perform the clipping of the same frequency in the primary spectrum shaping, it may result in a rate which is strictly set in some cases, however, which is acceptable because it is assumed that overlapping is not allowed.

The above processing after the formula (4) is repeated, and when having the most increased ΔI of the clipping rate than the ΔI of the previous rate, the previous clipping rate serves as an optimum clipping rate. Here, the increase and decrease of the clipping rate may be changed for each of the discrete frequency, however, a case where the number of a DFT point is increased is complicated, thus a combination of the rates such as Table 1 is set as LUT (look Up Table) in advance, and the transition may as well be performed according to the value of the formula (12).

TABLE 1

| | Clipping rate of signal of transmission device 1 | Clipping rate of signal of transmission device 2 |
|---|---|---|
| + | 70% | 30% |
| | 65% | 35% |
| | 60% | 40% |
| | 55% | 45% |
| Initial state s | 50% | 50% |
| − | 45% | 55% |
| | 40% | 60% |
| | 35% | 65% |
| | 30% | 70% |

For example, when Table 1 is used, one transition is made in a + (plus) direction when ΔI is positive, and one transition is made in a − (minus) direction in the case of negative. This is repeated, and when ΔI (s+n) after transition is increased more than ΔI (s+p) in a previous state, the clipping rate in a previous state s+p is optimized. In this manner, control is made so that the difference of the input and output characteristics of MI of the equalization unit for detecting a signal of each transmission device becomes the most smallest according to a propagation path variation which is changing momentarily, whereby the in be in a state of convergence is easy to be kept to be able to be transmitted data stably.

Figure 5:
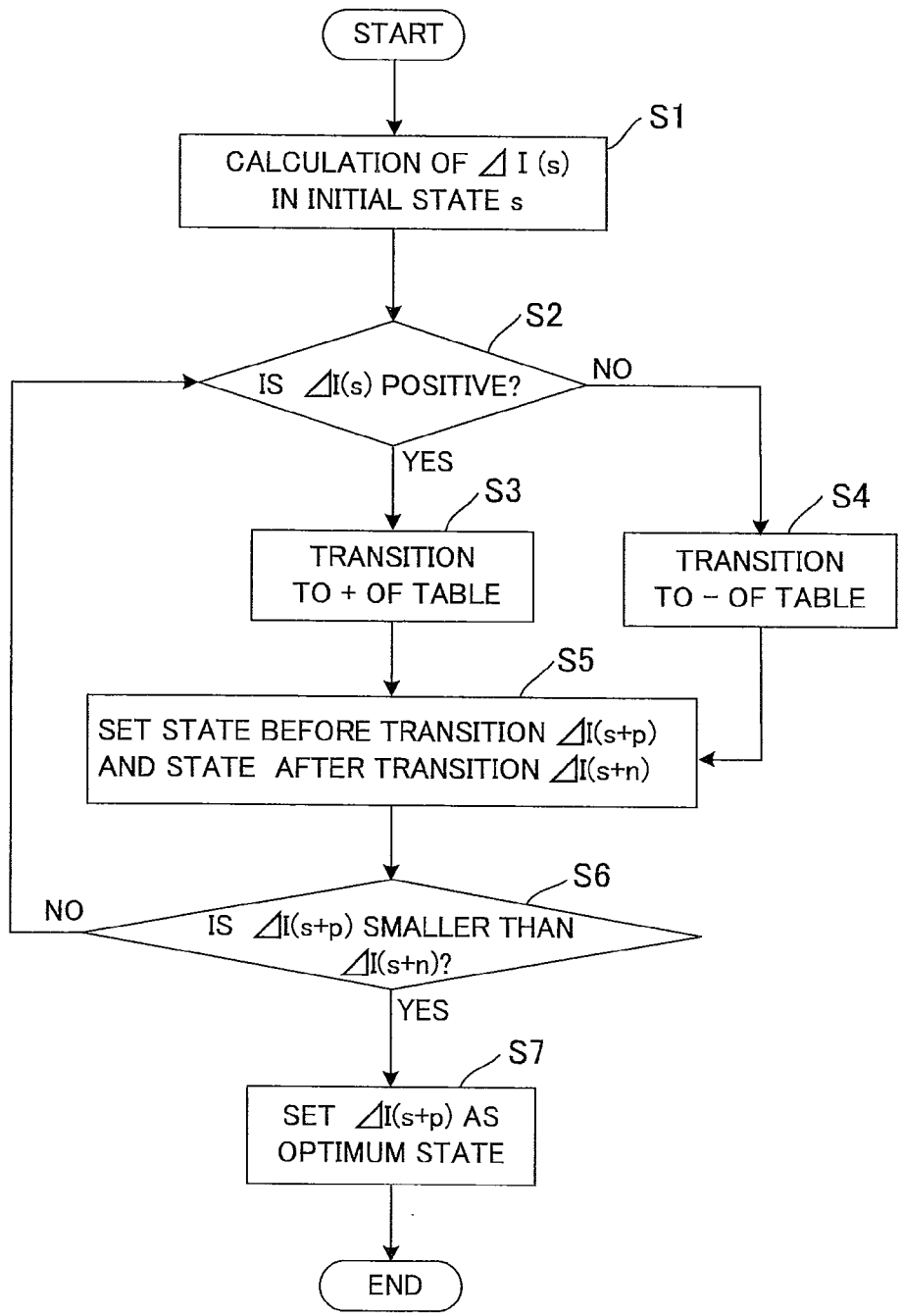
FIG. 5 is a processing flowchart.

A flow chart of the above processing of the scheduling unit 26 is shown in FIG. 5. First, a difference ΔI(s) of mutual information in the initial state s at a step S1 is calculated to be judged whether it is positive at a step S2. One transition is made in a + (plus) direction of Table 1 at a step S3 when ΔI(s) is positive, and a transition is made in a − (minus) direction at a step S4 in the case of negative. For a combination of the clipping rate in a next state determined in this manner, ΔI(s+p) in a state before transition s+p and ΔI(s+n) in a state after transition s+n at a step S5 are set, and the sizes are compared at a step S6. When ΔI(s+p) in the state before transition is smaller, since it is able to be considered that the difference becomes larger, a state of the state before transition ΔI(s+p) is set as the clipping rate. On the other hand, since there is still a possibility for enabling the difference of the input and output characteristics of MI of the equalizer to be smaller when ΔI(s+p) is larger, s is replaced with s+n to return to the step S2, which is repeated.

In this manner, control is made so that the convergent state is kept adaptively for the propagation path which is changing momentarily, whereby a stable transmission rate is able to be achieved.

[Second Embodiment]

In the first embodiment, a case where signals from all transmission devices are caused to be orthogonal on the frequency axis without allowing overlapping has been explained. However, since the reception device (base station device) has the interference prevention function, even when overlapping is made, for the overlapped spectrum, even signals from other transmission devices are input into a canceller in which an inter-code interference component in a signal of each transmission device is detected, and the signals are able to be completely separated when cancelling collectively.

Figure 6:
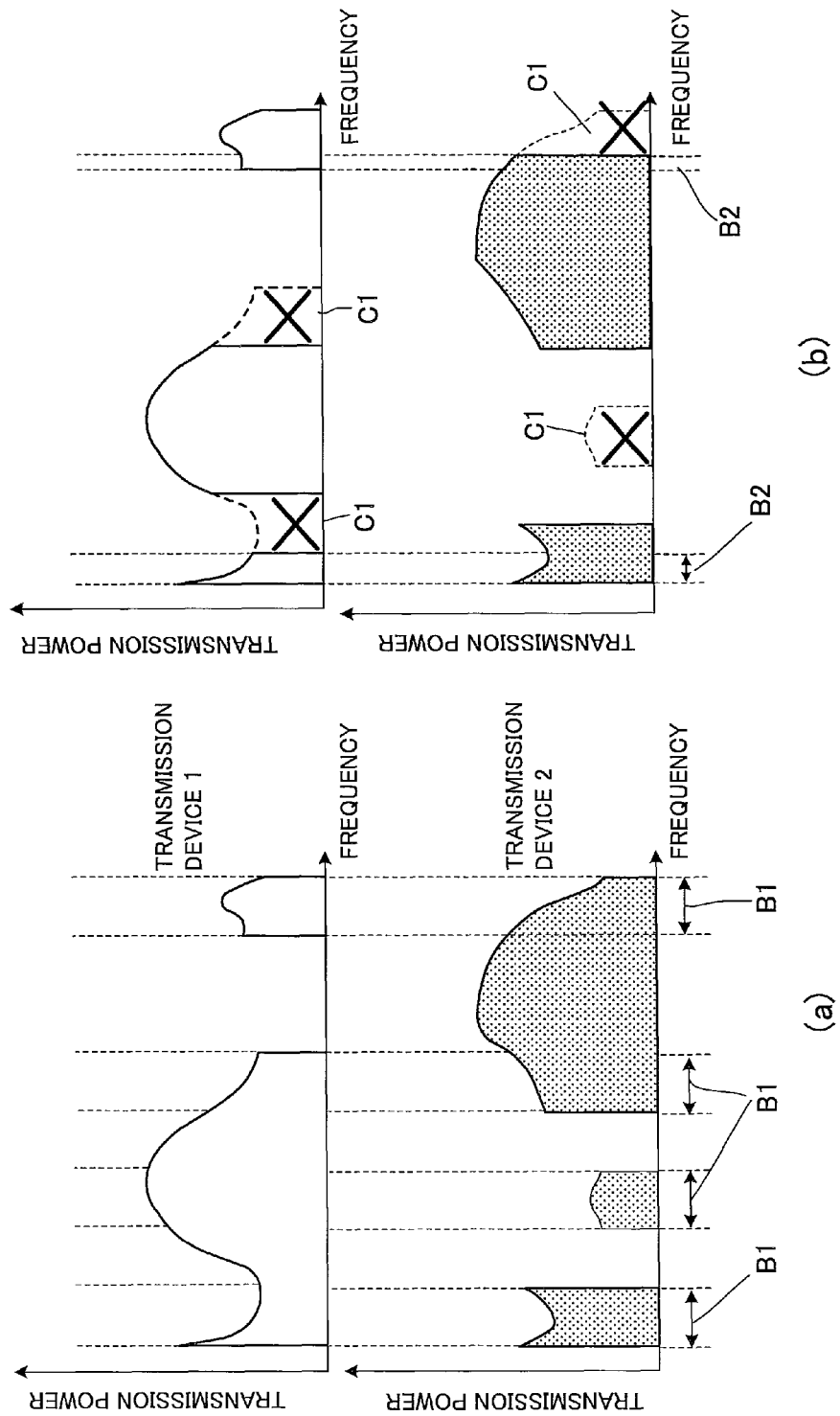
FIG. 6 shows a concept of spectrum shaping when overlapping of a signal of each transmission device is allowed, where (a) shows a concept of primary spectrum shaping and (b) shows a concept of secondary spectrum shaping.

Concepts of the primary spectrum shaping and the secondary spectrum shaping when overlapping of a signal of each transmission device is allowed is shown in FIG. 6. FIG. 6 (a) shows a concept of the primary spectrum shaping (overlapping spectrum B1), and control is based on the same water filling principle as the first embodiment, thereby the explanation is omitted. FIG. 6 (b) shows a concept of the secondary spectrum shaping, and since overlapping is allowed (overlapping spectrum B2), the clipping is performed at a certain rate in order from the propagation path in a worse state (spectrum C1 that is subjected to the clipping). Therefore, a part of the spectrum overlapping is remained as shown in the figure, however, since the reception device (base station device) may demodulate signals from both transmission devices, the signals are able to be separated completely when suppressing collectively not only inter-code interference but also interference of signals between the transmission devices in the case of interference prevention so that final transmission characteristics are able to be obtained at a maximum with this approach.

Figure 7:
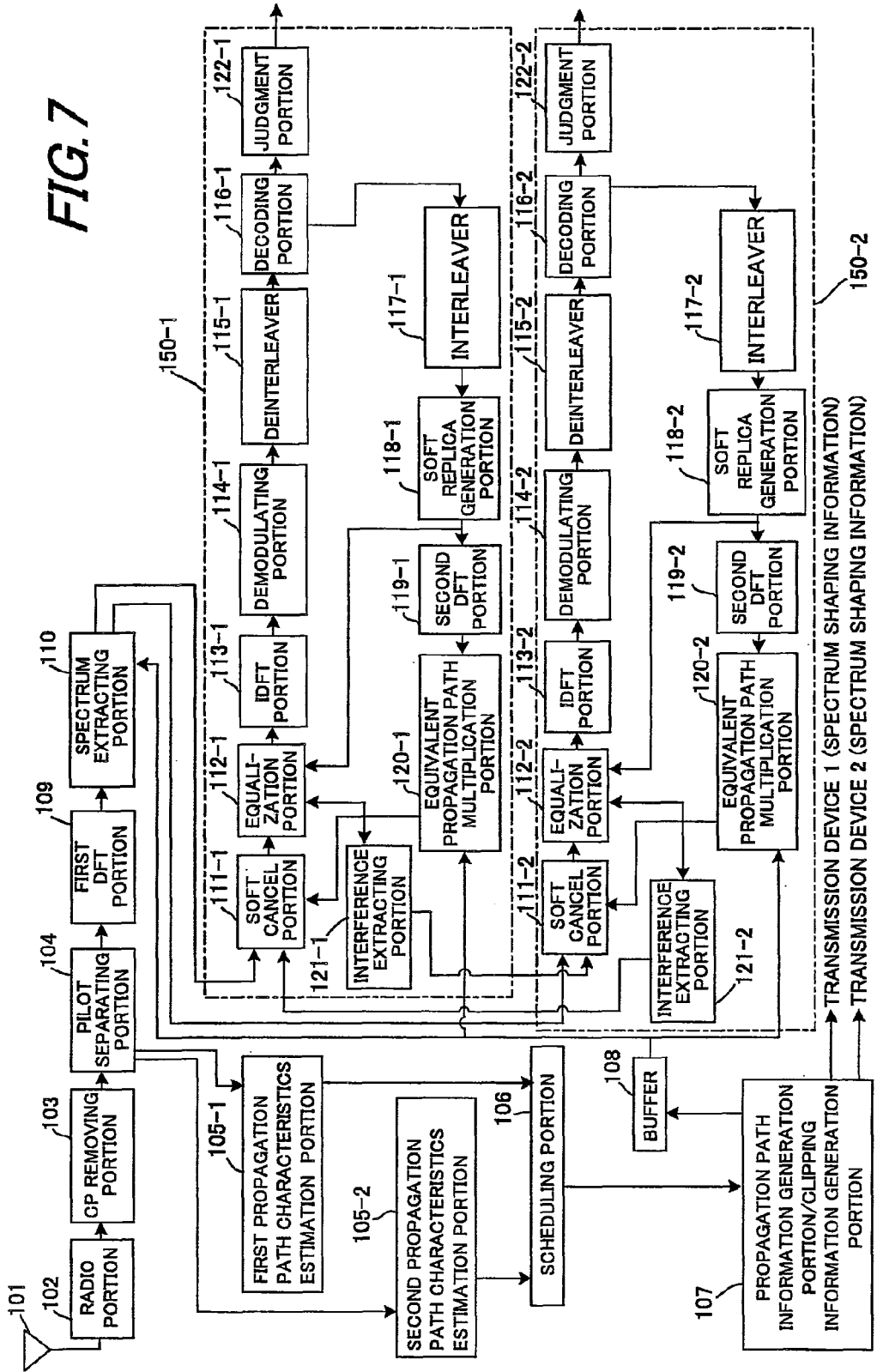
FIG. 7 is a block diagram showing a second embodiment of the reception device according to the present invention.
Figure 8:
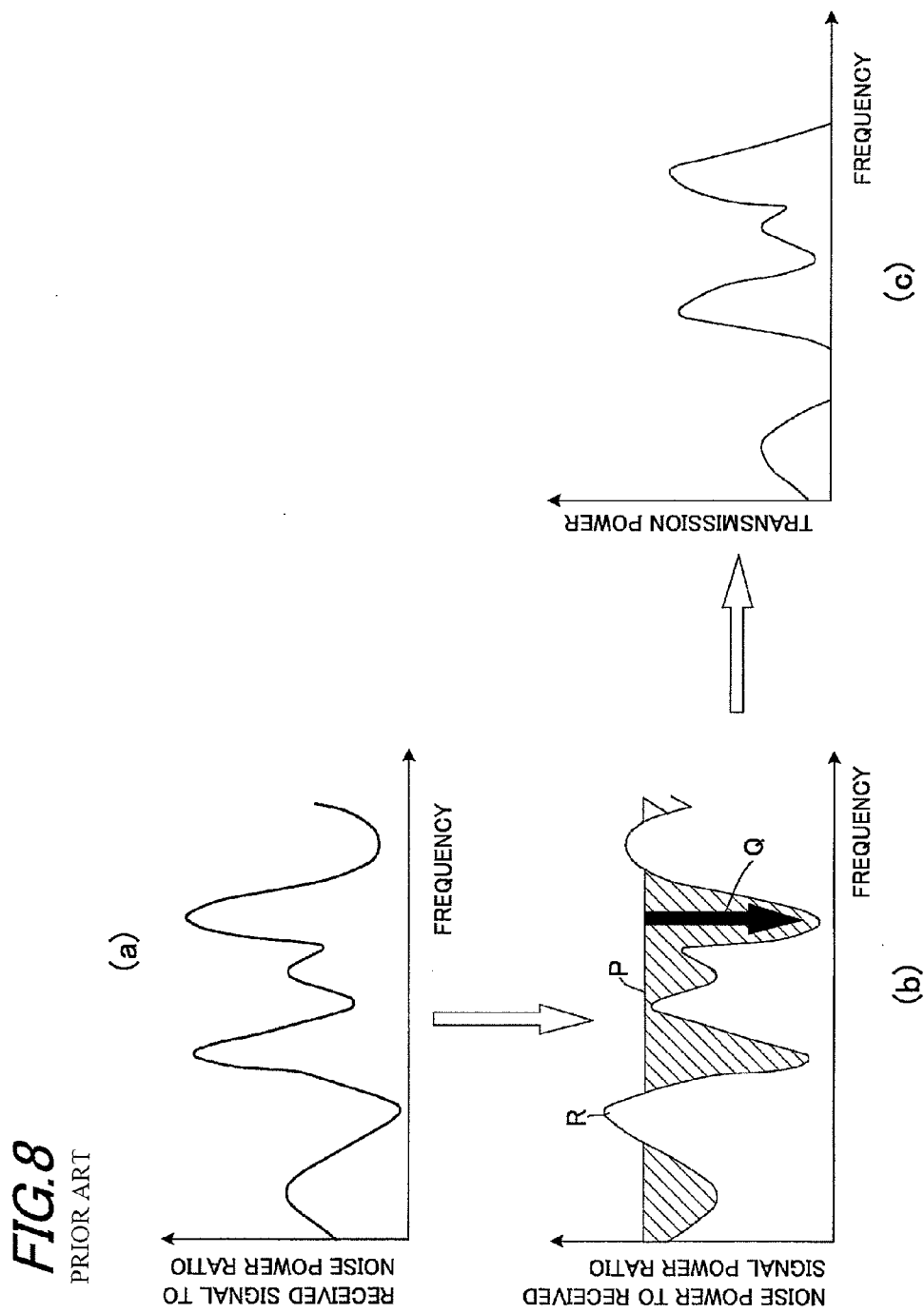
FIG. 8 is an explanatory view showing a concept of a water filling principle.
Figure 9:
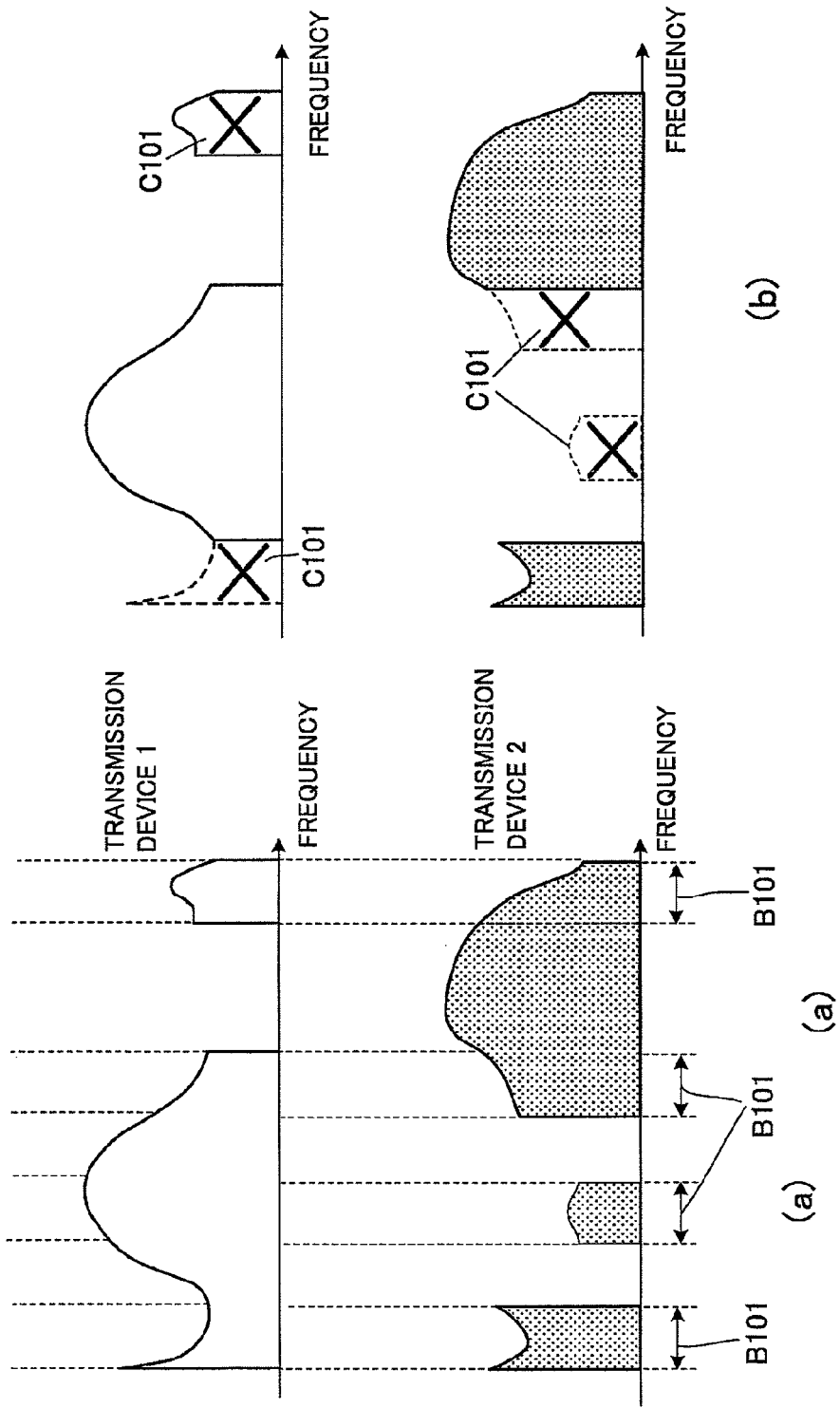
FIG. 9 is an explanatory view showing a concept of spectrum shaping by clipping when two transmission devices communicate with a base station device.
Figure 10:
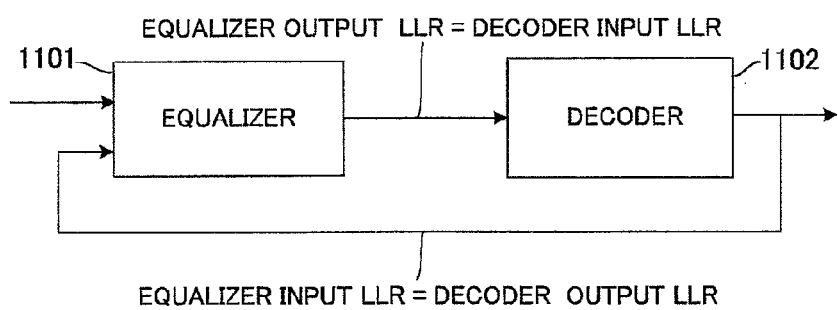
FIG. 10 is a block diagram of an external information exchange analysis model.

An example of the reception device (base station device) is shown in FIG. 7. The reception device is comprised of a reception antenna 101, a radio unit 102, a CP removing unit 103, a pilot separating 104, a first propagation path estimation unit 105-1, a second propagation path estimation unit 105-2, a scheduling unit 106, a propagation path information generation unit/clipping information generation unit 107, a buffer 108, a first DFT unit 109, a spectrum extracting unit 110, a soft cancel units 111-1 and 111-2, equalization units 112-1 and 112-2, IDFTs 113-1 and 113-2, demodulating units 114-1 and 114-2, deinterleavers 115-1 and 115-2, decoding units 116-1 and 116-2, interleavers 117-1 and 117-2, soft replica generation units 118-1 and 118-2, second DFT units 119-1 and 119-2, equivalent propagation path multiplication units 120-1 and 120-2, interference extracting units 121-1 and 121-2, and judgment units 122-1 and 122-2. The reception antenna 101, the radio unit 102, the CP removing unit 103, the pilot separating 104, the first propagation path estimation unit 105-1, the second propagation path estimation unit 105-2, the scheduling unit 106, the propagation path information generation unit/clipping information generation unit 107, the buffer 108, the first DFT unit 109, the spectrum extracting unit 110, the soft cancel units 111-1 and 111-2, equalization units 112-1 and 112-2, IDFTs 113-1 and 113-2, demodulating units 114-1 and 114-2, deinterleavers 115-1 and 115-2, decoding units 116-1 and 116-2, interleavers 117-1 and 117-2, soft replica generation units 118-1 and 118-2, second DFT units 119-1 and 119-2, equivalent propagation path multiplication units 120-1 and 120-2, and judgment units 122-1 and 122-2 have the same functions as those of a block with the same designations in FIG. 2 in the first embodiment, thereby the explanation is omitted. Additionally, a block of 150-1 is a block for detecting only a signal from the first transmission device, and a block of 150-2 is a block for detecting only a signal from the second transmission device. In the interference extracting units 121-1 and 121-2, only overlapped interference is extracted from a signal from other transmission device as described above, which is cancelled by the soft cancel units 111-1 and 111-2 respectively.

In the scheduling unit 106, the rate for clipping spectrum of frequency with low propagation path gain is determined according to variation of the propagation path in the primary spectrum shaping and the secondary spectrum shaping shown in FIG. 6. Note that, a determination method of the clipping rate is same as the first embodiment. However, since signals from other transmission devices are remained as interference in this case, the formula (6) expressing the receiving signal to noise power ratio of the starting point in the transmission device 1 is as the following formula (13).

[Formula 9]

$$\gamma_{start}^1 = \frac{1}{K}\sum_{k=1}^{K}\frac{|\eta_1(k)|^2}{|\eta_1(k)|^2 + \sum_{u=2}^{U}|\eta_u'(k)|^2 + N_0} \quad (13)$$

Wherein, u denotes an index of the transmission device, and U denotes the number of the total transmission devices that are concurrently multiplexed. The receiving signal to noise power ratio is calculated by the formula (4) using values thereof. Further, $\eta'_u(k)$ is equivalent propagation path gain extracting only frequency overlapped with a signal from the transmission device 1 in the equivalent propagation path gain including even effect of the spectrum shaping of the signal of the u-th transmission device.

In this manner, by allowing and multiplexing even overlapping, not only the scheduling is also easily performed but also many transmission devices are able to be accommodated with a small number of frequency, as well as other transmission devices are able to be multiplexed since overlapping is allowed so that empty spectrum is available.

Third Embodiment

Figure 12:
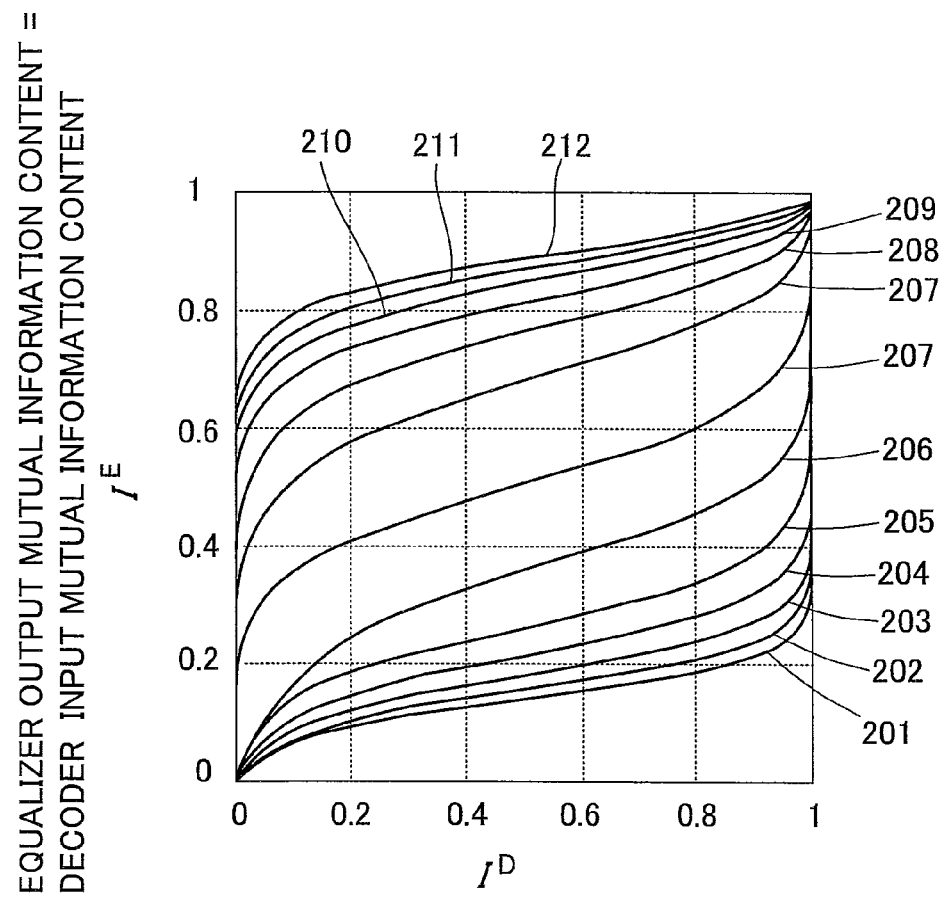
FIG. 12 shows input and output characteristics of mutual information of a decoder when error correction coding is convolutional coding.

As a third embodiment, the embodiments so far show a case where encoding ratios of all transmission devices are same, however, in the present embodiment, the encoding ratio of error correction coding that each transmission device applies is also able to be controlled together. The input and output characteristics of mutual information of a decoder in the case of the encoding ratios of 1/8, 1/7, 1/6/, 1/5, 1/4, 1/3, 1/2, 2/3, 3/4, 4/5, 5/6, 6/7 and 7/8 when error correction coding is convolutional coding are shown in FIG. 12. In the same figure, 201 denotes decoder characteristics of the encoding ratio 1/8, and 202 to 212 similarly denote decoder characteristics of the encoding ratio in the above-described order respectively. Further, in the same manner as FIG. 11, an ordinate axis shows decoder input mutual information, and an abscissa axis shows decoder output mutual information, since the input and output characteristics are uniquely determined by a coding structure, it is no need to calculate for each of transmission opportunities, and storing in a memory or the like is allowed. In this manner, the lower the encoding ratio is, the more redundant bits are, and the error correction is intensive so that the required input mutual information is decreased in order to achieve the same output mutual information. In this manner, the clipping and the encoding ratio are optimized collectively by using which the characteristics are different for each of the encoding ratios.

Figure 13:
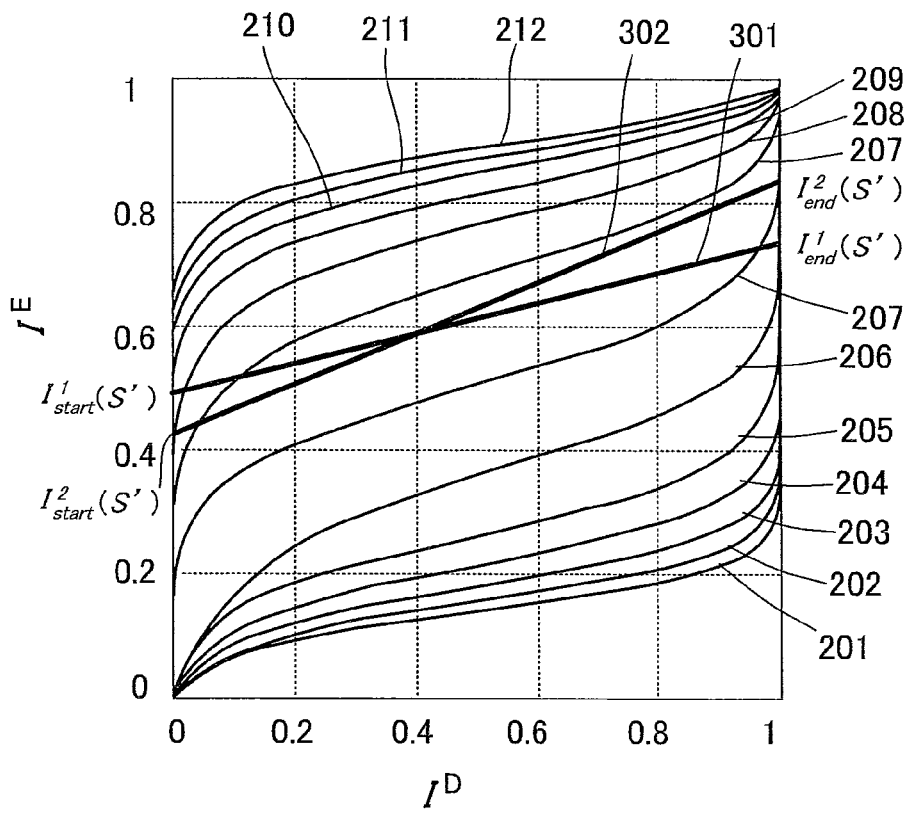
FIG. 13 shows an example of an EXIT chart for optimizing in a third embodiment.

An example of an EXIT chart for optimizing in the present embodiment is shown in FIG. 13. Starting points of the transmission devices optimized in the first embodiment or in the second embodiment are $I^1_{start}(s')$ and $I^2_{start}(s')$, and ending points are $I^1_{end}(S')$ and $I^2_{end}(S')$. Here, the number of the transmission devices is explained as 2, however, a case of having 3 or more are also applicable. In the same figure, 301 denotes input and output characteristics of the mutual information of the equalization unit that connects with a straight line the value of the starting point and the ending point optimized in the transmission device 1, and 302 denotes input and output characteristics of the mutual information of the equalization unit that connects with a straight line the value of the starting point and the ending point optimized in the transmission device 2. The encoding ratio at which 301 and 302 shown in the same figure are not crossed is selected so that turbo equalization is able to be converged correctly. The reception device performs processing for determining the clipping rate and the encoding ratio by a scheduling unit 26 of the FIG. 2, although not shown, and the scheduling unit 106 of FIG. 7, and encoding information on the determined encoding ratio is transmitted to the transmission device together with shaping information (propagation path information, clipping information) by the propagation path information generation unit/clipping information generation units 27 and 107. Encoding information fed back from the reception device is received by the transmission device in FIG. 1 to be detected by a not-shown encoding information detection unit, which are encoded at an encoding ratio of the encoding information by the coding unit 1.

Note that, the convolutional coding is used here, but may be, for example, the error correction coding such as turbo coding, low-density parity check (LDPC: Low Density Parity Check), or the like. Additionally, as an approach for setting the input and output characteristics of the mutual information of the equalization unit and the input and output characteristics of the decoding unit calculated in each transmission device so as to be not crossed, a predetermined threshold is provided, and at the point where the input and output characteristics of the equalization unit becomes nearest to the input and output characteristics of the decoding unit, the encoding ratio that is larger than width thereof and nearest to the input and output characteristics of the equalization unit may be selected.

These embodiments were applied in a case where two transmission devices communicate concurrently, however, a case of three transmission devices or more is also applicable.

Additionally, these embodiments were described in the single carrier transmission method, however, when a transmittable frequency band is wider than a bandwidth of a signal, each discrete spectrum is allocated to frequency of a good reception state, and the dynamic spectrum control that returns to original arrangement on the receiving side is returned to the single carrier method when frequency characteristics of the propagation path are extracted from frequency that a signal is allocated to be reconstructed, whereby is also applicable.

Further, the single carrier transmission is able to be considered also as a multi-carrier method that is applied with frequency spread, and is thus also applicable to MC-CDM (Multi-Carrier Code Division Multiplexing) that is the multi-carrier method by using a spread code in place of DFT.

EXPLANATIONS OF NUMERALS

1 coding unit
2 interleaver
3 modulating unit
4 DFT unit
5 propagation path information detection unit
6 primary spectrum shaping unit
7 clipping information detection unit
8 secondary spectrum shaping unit
9 IDFT unit
10 pilot signal generation unit
11 pilot signal multiplex unit
12 CP inserting unit
13 radio unit
14 transmission antenna
21 reception antenna
22 radio unit
23 CP removing unit
24 pilot separating unit
25-1 first propagation path estimation unit
25-2 second propagation path estimation unit
26 scheduling unit
27 propagation path information generation unit/clipping information generation unit
28 buffer
29 first DFT unit
30 spectrum extracting unit
31-1, 31-2 soft cancel unit
32-1, 32-2 equalization unit
33-1, 33-2 IDFT unit
34-1, 34-2 demodulating unit
35-1, 35-2 deinterleaver
36-1, 36-2 decoding unit
37-1, 37-2 interleaver
38-1, 38-2 soft replica generation unit
39-1, 39-2 second DFT unit
40-1, 40-2 equivalent propagation path multiplication unit
41-1, 41-2 judgment unit
101 reception antenna
102 radio unit
103 CP removing unit
104 pilot separating unit
105 propagation path estimation unit
105-1 first propagation path estimation unit
105-2 second propagation path estimation unit
106 scheduling unit
107 propagation path information generation unit/clipping information generation unit
108 buffer
109 first DFT unit
110 spectrum extracting unit
111-1, 111-2 soft cancel unit
112-1, 112-2 equalization unit
113-1, 113-2 IDFT unit
114-1, 114-2 demodulation unit
115-1, 115-2 deinterleaver
116-1, 116-2 decoding unit
117-1, 117-2 interleaver
118-1, 118-2 soft replica generation unit
119-1, 119-2 second DFT unit
120-1, 120-2 equivalent propagation path multiplication unit
121-1, 121-2 interference extracting unit
122-1, 122-2 judgment unit

What is claimed is:

1. A radio communication system comprising:
a plurality of transmission devices that spread a frequency of a transmitting signal, allocate the frequency spread signal to discrete frequencies, and apply spectrum shaping including at least clipping to the allocated signal for transmission; and
a reception device that receives the transmitting signal; wherein the reception device generates transmission path information related to propagation path characteristics between all the transmission devices and the reception device and clipping information related to a clipping rate of spectrum adaptively controlled according to the propagation path characteristics based on the transmitting signal to feed back to the transmission devices, and the transmission device adaptively controls the clipping rate according to the propagation path characteristics between all the transmission devices and the reception device, based on the transmission path information and the clipping information which are fed back, so as to apply spectrum shaping, and performs multiplexing by frequency, wherein the transmission device does not cause spectrum to overlap with a transmitting signal of other transmission device by clipping.

2. The radio communication system according to claim 1, wherein the transmission device causes a part of spectrum to be overlapped with a transmitting signal of other transmission device by clipping.

3. The radio communication system according to claim 1, wherein the transmission device comprises:
a primary spectrum shaping unit that distributes power in such a manner that reception energy increases based on the propagation path characteristic information, and a secondary spectrum shaping unit that applies at least the clipping based on the clipping information, and wherein the reception device comprises:
a propagation path estimation unit that estimates propagation path characteristics which are frequency response characteristics of a propagation path from the transmission device to the reception device;
a scheduling unit that determines the clipping rate of each transmission device based on the propagation path characteristics;
a spectrum extracting unit that extracts a frequency spread signal of each transmission device from a received signal based on the spectrum allocation information;
a soft cancel unit that at least cancels a replica of the transmitting signal from the signal extracted by the spectrum extracting unit;
an equalization unit that detects a transmitting signal transmitted by the transmission device for an output from the soft cancel unit;
a demodulating unit that extracts information related to coding data from the detected signal;
a decoding unit that performs error correction processing for information related to the extracted coding data to renew the information;
a soft replica generation unit that generates a replica of the transmitting signal from information related to the renewed coding data;
an equivalent propagation path characteristic multiplication unit that generates a receiving signal replica with even an effect of spectrum shaping applied in the transmission device as the propagation path characteristics; and
an information generation unit that generates propagation path information related to the propagation path characteristics estimated by the propagation path estimation unit and clipping information related to the clipping rate determined by the scheduling unit to feed back to the transmission device.

4. The radio communication system according to claim 3, wherein the scheduling unit determines the clipping rate based on an EXIT chart calculated from mutual information of input and output characteristics of the equalization unit.

5. The radio communication system according to claim 4, wherein
as for equalization characteristics between at least two transmission devices and at least one reception device, the equalization characteristics including first equalization characteristics regarding a first transmission device and second equalization characteristics regarding the second transmission device, the scheduling unit obtains a difference of mutual information using the first equalization characteristics and the second equalization characteristics, increases a clipping rate of the second transmission device or decreases a clipping rate of the first transmission device when the difference is positive, and decreases the clipping rate of the second transmission device or the clipping rate of the first transmission device when the difference is negative.

6. A radio communication system comprising:
a plurality of transmission devices that spread a frequency of a transmitting signal, allocate the frequency spread signal to discrete frequencies, and apply spectrum shaping including at least clipping to the allocated signal for transmission; and
a reception device that receives the transmitting signal; wherein
the reception device generates transmission path information related to propagation path characteristics between all the transmission devices and the reception device, clipping information related to a clipping rate of spectrum adaptively controlled according to the propagation path characteristics and an encoding ratio of error correction coding of the received signal, and encoding information related to the encoding ratio to feed back to the transmission device, and
the transmission device adaptively controls the clipping rate according to the propagation path characteristics between all the transmission devices and the reception device based on the transmission path information, the clipping information and the encoding information which are fed back, controls the encoding ratio of the error correction coding in the transmission device according to the clipping rate to apply spectrum shaping, and performs multiplexing by frequency,
wherein the transmission device does not cause spectrum to overlap with a transmitting signal of other transmission device by clipping.

7. The radio communication system according to claim 6, wherein
the transmission device comprises:
an encoding unit that encodes a transmitting signal based on the encoding information;
a primary spectrum shaping unit that distributes power in such a manner that reception energy increases based on the propagation path characteristic information; and
a secondary spectrum shaping unit that applies at least the clipping based on the clipping information, and
the reception device comprises:
a propagation path estimation unit that estimates propagation path characteristics which are frequency response characteristics of a propagation path from the transmission device to the reception device;
a scheduling unit that determines an encoding ratio of error correction coding of a received signal and the clipping rate of each transmission device by the encoding ratio based on the propagation path characteristics;
a spectrum extracting unit that extracts a frequency spread signal of each transmission device from a received signal based on the spectrum allocation information;
a soft cancel unit that at least cancels a replica of the transmitting signal from the signal extracted by the spectrum extracting unit;
an equalization unit that detects a transmitting signal transmitted by the transmission device for an output from the soft cancel unit;

a demodulating unit that extracts information related to coding data from the detected signal;

a decoding unit that performs error correction processing for information related to the extracted coding data to renew the information;

a soft replica generation unit that generates a replica of the transmitting signal from information related to the renewed coding data;

an equivalent propagation characteristic path multiplication unit that generates a receiving signal replica with even an effect of the spectrum shaping applied in the transmission device as the propagation path characteristics; and an information generation unit that generates propagation path information related to the propagation path characteristics estimated by the propagation path estimation unit, encoding information related to the encoding ratio determined by the scheduling unit, and clipping information related to the clipping rate to feed back to the transmission device.

8. The radio communication system according to claim 7, wherein the scheduling unit determines the encoding ratio according to decoding characteristics of the decoding unit by the encoding ratio.

9. A reception device that receives a signal from a transmission device provided with a primary spectrum shaping unit that distributes power in such a manner that reception energy increases and a secondary spectrum shaping unit that applies at least clipping, allocating a frequency spread signal to discrete frequencies, and applying spectrum shaping to the allocated signal for transmission, the reception device comprising:

a propagation path estimation unit that estimates propagation path characteristics which are frequency response characteristics of a propagation path from the transmission device to the reception device;

a scheduling unit that determines the clipping rate of each transmission device based on the propagation path characteristics;

a spectrum extracting unit that extracts a frequency spread signal of the transmission device from a received signal based on the spectrum allocation information;

a soft cancel unit that at least cancels a replica of the transmitting signal from the signal extracted by the spectrum extracting unit;

an equalization unit that detects a transmitting signal transmitted by the transmission device for an output from the soft cancel unit;

a demodulating unit that extracts information related to coding data from the detected signal, a decoding unit that performs error correction processing for information related to the extracted coding data to renew the information;

a soft replica generation unit that generates a replica of the transmitting signal from information related to the renewed coding data;

an equivalent propagation path characteristic multiplication unit that generates a receiving signal replica with even an effect of spectrum shaping applied in the transmission device as the propagation path characteristics; and an information generation unit that generates propagation path information related to the propagation path characteristics estimated by the propagation path estimation unit and clipping information related to the clipping rate determined by the scheduling unit to feed back to the transmission device.

10. The reception device according to claim 9, wherein the scheduling unit determines the clipping rate based on an EXIT chart calculated from the propagation path characteristics.

11. The reception device according to claim 10, wherein the scheduling unit comprises:

means for calculating a difference of mutual information in an initial state of the EXIT chart calculated from the propagation path characteristics and an initial value of the clipping rate, and judging whether the difference is positive;

means for increasing the clipping rate when the difference is positive, and decreasing the clipping rate when the difference is negative;

means for setting a difference of mutual information in a state before transition and a difference of mutual information in a state after transition for a combination of clipping rates in a determined following state and comparing the differences in size; and means for setting the state before transition as an optimum clipping rate when the difference of the mutual information in the state before transition is smaller, and repeating processing to judge the difference of the mutual information again with the state after transition as the state before transition when the difference of the mutual information in the state after transition is larger.

12. A reception device that receives a signal from a transmission device provided with a primary spectrum shaping unit that distributes power in such a manner that reception energy increases and a secondary spectrum shaping unit that applies at least clipping, allocating a frequency spread signal to discrete frequencies, and applying spectrum shaping to the allocated signal for transmission, the reception device comprising:

a propagation path estimation unit that estimates propagation path characteristics which are frequency response characteristics of a propagation path from the transmission device to the reception device;

a scheduling unit that determines an encoding ratio of error correction coding of a received signal and the clipping rate of each transmission device by the encoding ratio based on the propagation path characteristics;

a spectrum extracting unit that extracts a frequency spread signal of the transmission device from a received signal based on the spectrum allocation information;

a soft cancel unit that at least cancels a replica of the transmitting signal from the signal extracted by the spectrum extracting unit;

an equalization unit that detects a transmitting signal transmitted by the transmission device for an output from the soft cancel unit;

a demodulating unit that extracts information related to coding data from the detected signal;

a decoding unit that performs error correction processing for information related to the extracted coding data to renew the information;

a soft replica generation unit that generates a replica of the transmitting signal from information related to the renewed coding data, an equivalent propagation path characteristic multiplication unit that generates a receiving signal replica with even an effect of spectrum shaping applied in the transmission device as the propagation path characteristics; and an information generation unit that generates propagation path information related to the propagation path characteristics estimated by the propagation path estimation unit, encoding information related to the encoding ratio determined by the scheduling unit, and clipping information related to the clipping rate to feed back to the transmission device.

13. A communication method of a radio communication system comprising a plurality of transmission devices that spread a frequency of a transmitting signal, allocate the frequency spread signal to discrete frequencies, and apply spectrum shaping including at least clipping to the allocated signal, and a reception device that receives the transmitting signal, the method characterized in that the reception device generates transmission path information related to propagation path characteristics between all the transmission devices and the reception device and clipping information related to a clipping rate of spectrum adaptively controlled according to the propagation path characteristics based on the transmitting signal to feed back to the transmission device, and the transmission device adaptively controls the clipping rate according to the propagation path characteristics between all the transmission devices and the reception device based on the transmission path information and the clipping information which are fed back to apply spectrum shaping, and performs multiplexing by frequency, wherein the transmission device does not cause spectrum to overlap with a transmitting signal of other transmission device by clipping.

14. The communication method according to claim 13, wherein the transmission device does not cause a part of spectrum to overlap with a transmitting signal of other transmission device by clipping.

15. The communication method according to claim 13, wherein the clipping rate is determined based on an EXIT chart calculated from the propagation path characteristics.

16. The communication method according to claim 15, comprising: as for the clipping rate, a step of calculating a difference of mutual information in an initial state using the EXIT chart calculated by the propagation path characteristics and an initial value of the clipping rate, and judging whether the difference is positive;

a step of increasing the clipping rate when the difference is positive, and decreasing the clipping rate when the difference is negative;

a step of setting a difference of mutual information in a state before transition and a difference of the mutual information in a state after transition for a combination of clipping rates in a determined following state, and comparing the differences in size; and a step of setting the state before transition as an optimum clipping rate when the difference of the mutual information in the state before transition is smaller, and returning to a step of judging the difference of the mutual information again with the state after transition as the state before transition when the difference of the mutual information in the state after transition is larger.

17. A communication method of a radio communication system comprising a plurality of transmission devices that spread a frequency of a transmitting signal, allocate the frequency spread signal to discrete frequencies, and apply spectrum shaping including at least clipping to the allocated signal, and a reception device that receives the transmitting signal, the method characterized in that the reception device generates transmission path information related to propagation path characteristics between all the transmission devices and the reception device, clipping information related to a clipping rate of spectrum adaptively controlled according to the propagation path characteristics and an encoding ratio of error correction coding of the received signal, and encoding information related to the encoding ratio to feed back to the transmission device, and the transmission device adaptively controls the clipping rate according to the propagation path characteristics between all the transmission devices and the reception device based on the transmission path information, the clipping information and the encoding information which are fed back, and controls the encoding ratio of the error correction coding in the transmission device according to the clipping rate to apply spectrum shaping, and performs multiplexing by frequency, wherein the transmission device does not cause spectrum to overlap with a transmitting signal of other transmission device by clipping.

* * * * *